United States Patent
Morariu et al.

(10) Patent No.: US 12,333,844 B2
(45) Date of Patent: Jun. 17, 2025

(54) EXTRACTING DOCUMENT HIERARCHY USING A MULTIMODAL, LAYER-WISE LINK PREDICTION NEURAL NETWORK

(71) Applicant: Adobe Inc., San Jose, CA (US)

(72) Inventors: Vlad Morariu, Potomac, MD (US); Puneet Mathur, College Park, MD (US); Rajiv Jain, Vienna, VA (US); Ashutosh Mehra, Noida (IN); Jiuxiang Gu, College Park, MD (US); Franck Dernoncourt, Sunnyvale, CA (US); Anandhavelu N, Kangayam (IN); Quan Tran, San Jose, CA (US); Verena Kaynig-Fittkau, Cambridge, MA (US); Nedim Lipka, Santa Clara, CA (US); Ani Nenkova, Philadelphia, PA (US)

(73) Assignee: Adobe Inc., San Jose, CA (US)

( * ) Notice: Subject to any disclaimer, the term of this patent is extended or adjusted under 35 U.S.C. 154(b) by 372 days.

(21) Appl. No.: 18/055,752

(22) Filed: Nov. 15, 2022

(65) Prior Publication Data
US 2024/0161529 A1 May 16, 2024

(51) Int. Cl.
*G06V 30/413* (2022.01)
*G06V 10/82* (2022.01)

(52) U.S. Cl.
CPC ............ *G06V 30/413* (2022.01); *G06V 10/82* (2022.01)

(58) Field of Classification Search
USPC ........................................................ 382/156
See application file for complete search history.

(56) References Cited

U.S. PATENT DOCUMENTS

2023/0079343 A1* 3/2023 Roy .......................... G06N 5/01
  707/739
2023/0351115 A1* 11/2023 Zeng .................... G06V 30/413

OTHER PUBLICATIONS

Carbonell et al., "Named Entity Recognition and Relation Extraction with Graph Neural Networks in Semi Structured Documents", 2021, by Manual Carbonell, Pau Riba, Mauricio Villegas, Alicia Fornes, and Josep Llados, in 2020 25th International Conference on Pattern Recognition (ICPR), IEEE, 9622-9627.*

(Continued)

*Primary Examiner* — Jacky X Zheng
(74) *Attorney, Agent, or Firm* — Keller Preece PLLC

(57) ABSTRACT

The present disclosure relates to systems, methods, and non-transitory computer-readable media that generate a digital document hierarchy comprising layers of parent-child element relationships from the visual elements. For example, for a layer of the layers, the disclosed systems determine, from the visual elements, candidate parent visual elements and child visual elements. In addition, for the layer of the layers, the disclosed systems generate, from the feature embeddings utilizing a neural network, element classifications for the candidate parent visual elements and parent-child element link probabilities for the candidate parent visual elements and the child visual elements. Moreover, for the layer, the disclosed systems select parent visual elements from the candidate parent visual elements based on the parent-child element link probabilities. Further, the disclosed systems utilize the digital document hierarchy to generate an interactive digital document from the digital document image.

20 Claims, 14 Drawing Sheets

(56) References Cited

OTHER PUBLICATIONS

Milan Aggarwal, Hiresh Gupta, Mausoom Sarkar, and Balaji Krishnamurthy. 2020. Form2Seq : A Framework for Higher-Order Form Structure Extraction. In Proceedings of the 2020 Conference on Empirical Methods in Natural Language Processing (EMNLP). Association for Computational Linguistics, Online, 3830-3840. https://doi.org/10.18653/v1/2020.emnlpmain. 314.

Milan Aggarwal, Mausoom Sarkar, Hiresh Gupta, and Balaji Krishnamurthy. 2020. Multi-Modal Association based Grouping for Form Structure Extraction. 2020 IEEE Winter Conference on Applications of Computer Vision (WACV) (2020), 2064-2073.

Srikar Appalaraju, Bhavan Jasani, Bhargava Urala Kota, Yusheng Xie, and R Manmatha. 2021. DocFormer: End-to-End Transformer for Document Understanding. arXiv preprint arXiv:2106.11539 (2021).

Manuel Carbonell, Pau Riba, Mauricio Villegas, Alicia Fornés, and Josep Lladós. 2021. Named Entity Recognition and Relation Extraction with Graph Neural Networks in Semi Structured Documents. In 2020 25th International Conference on Pattern Recognition (ICPR). IEEE, 9622-9627.

Nicolas Carion, Francisco Massa, Gabriel Synnaeve, Nicolas Usunier, Alexander Kirillov, and Sergey Zagoruyko. 2020. End-to-end object detection with transformers. In European conference on computer vision. Springer, 213-229.

Jieshan Chen, Mulong Xie, Zhenchang Xing, Chunyang Chen, Xiwei Xu, Liming Zhu, and Guoqiang Li. 2020. Object detection for graphical user interface: old fashioned or deep learning or a combination? Proceedings of the 28th ACM Joint Meeting on European Software Engineering Conference and Symposium on the Foundations of Software Engineering (2020).

Christian Clausner, Stefan Pletschacher, and Apostolos Antonacopoulos. 2013. The significance of reading order in document recognition and its evaluation. In 2013 12th International Conference on Document Analysis and Recognition. IEEE, 688-692.

Tuan Anh Nguyen Dang, Duc Thanh Hoang, Quang Bach Tran, Chih-Wei Pan, and Thanh Dat Nguyen. 2021. End-to-End Hierarchical Relation Extraction for Generic Form Understanding. In 2020 25th International Conference on Pattern Recognition (ICPR). IEEE, 5238-5245.

Brian Davis, Bryan Morse, Brian Price, Chris Tensmeyer, and Curtis Wiginton. 2021. Visual FUDGE: Form Understanding via Dynamic Graph Editing. arXiv preprint arXiv:2105.08194 (2021).

Biplab Deka, Zifeng Huang, Chad Franzen, Joshua Hibschman, Daniel Afergan, Yang Li, Jeffrey Nichols, and Ranjitha Kumar. 2017. Rico: A Mobile App Dataset for Building Data-Driven Design Applications. In Proceedings of the 30th Annual Symposium on User Interface Software and Technology (UIST '17).

Dan Deng, Haifeng Liu, Xuelong Li, and Deng Cai. 2018. Pixel-Link: Detecting Scene Text via Instance Segmentation. ArXiv abs/1801.01315 (2018).

Jacob Devlin, Ming-Wei Chang, Kenton Lee, and Kristina Toutanova. 2019. BERT: Pre-training of Deep Bidirectional Transformers for Language Understanding. In NAACL.

Lukasz Garncarek, Rafal Powalski, Tomasz Stanislawek, Bartosz Topolski, Piotr Halama, Michal P. Turski, and Filip Grali'nski. 2021. LAMBERT: Layout-Aware Language Modeling for Information Extraction. In ICDAR.

Aditya Gupta, Anuj Kumar, Mayank, Vishwa Nath Tripathi, and Sashikala Tapaswi. 2007. Mobile web: web manipulation for small displays using multi-level hierarchy page segmentation. In Mobility '07.

Jaekyu Ha, Robert M. Haralick, and Ihsin T. Phillips. 1995. Document page decomposition by the bounding-box project. Proceedings of 3rd International Conference on Document Analysis and Recognition 2 (1995), 1119-1122 vol.2.

Leipeng Hao, Liangcai Gao, Xiaohan Yi, and Zhi Tang. 2016. A Table Detection Method for PDF Documents Based on Convolutional Neural Networks. 2016 12th IAPR Workshop on Document Analysis Systems (DAS) (2016), 287-292.

Adam W Harley, Alex Ufkes, and Konstantinos G Derpanis. 2015. Evaluation of Deep Convolutional Nets for Document Image Classification and Retrieval. In International Conference on Document Analysis and Recognition (ICDAR).

Dafang He, Scott D. Cohen, Brian L. Price, Daniel Kifer, and C. Lee Giles. 2017. Multi-Scale Multi-Task FCN for Semantic Page Segmentation and Table Detection. 2017 14th IAPR International Conference on Document Analysis and Recognition (ICDAR) 01 (2017), 254-261.

Teakgyu Hong, DongHyun Kim, Mingi Ji, Wonseok Hwang, Daehyun Nam, and Sungrae Park. 2020. Bros: A Pre-trained Language Model for Understanding Texts in Document. (2020).

Teakgyu Hong, Donghyun Kim, Mingi Ji, Wonseok Hwang, Daehyun Nam, and Sungrae Park. 2021. BROS: A Pre-trained Language Model Focusing on Text and Layout for Better Key Information Extraction from Documents. arXiv preprint arXiv:2108.04539 (2021).

Wonseok Hwang, Jinyeong Yim, Seunghyun Park, Sohee Yang, and Minjoon Seo. 2020. Spatial Dependency Parsing for Semi-Structured Document Information Extraction. arXiv preprint arXiv:2005.00642 (2020).

Guillaume Jaume, Hazim Kemal Ekenel, and Jean-Philippe Thiran. 2019. Funsd: A dataset for form understanding in noisy scanned documents. In 2019 International Conference on Document Analysis and Recognition Workshops (ICDARW), vol. 2. IEEE, 1-6.

Mohamed Khemakhem, Axel Herold, and Laurent Romary. 2018. Enhancing Usability for Automatically Structuring Digitised Dictionaries.

Franck Lebourgeois, Zbigniew Bublinski, and Hubert Emptoz. 1992. A fast and efficient method for extracting text paragraphs and graphics from unconstrained documents. Proceedings., 11th IAPR International Conference on Pattern Recognition. vol. II. Conference B: Pattern Recognition Methodology and Systems (1992), 272-276.

Chen-Yu Lee, Chun-Liang Li, Chu Wang, Renshen Wang, Yasuhisa Fujii, Siyang Qin, Ashok Popat, and Tomas Pfister. 2021. ROPE: Reading Order Equivariant Positional Encoding for Graph-based Document Information Extraction. In Proceedings of the 59th Annual Meeting of the Association for Computational Linguistics and the 11th International Joint Conference on Natural Language Processing (vol. 2: Short Papers). Association for Computational Linguistics, Online, 314-321. https://doi.org/10.18653/v1/2021.aclshort. 41.

Bohan Li, Hao Zhou, Junxian He, Mingxuan Wang, Yiming Yang, and Lei Li. 2020. On the Sentence Embeddings from Pre-trained Language Models. In Proceedings of the 2020 Conference on Empirical Methods in Natural Language Processing (EMNLP). Association for Computational Linguistics, Online, 9119-9130. https://doi.org/10.18653/v1/2020.emnlpmain. 733.

Kai Li, Curtis Wigington, Chris Tensmeyer, Handong Zhao, Nikolaos Barmpalios, Vlad I Morariu, Varun Manjunatha, Tong Sun, and Yun Fu. 2020. Cross-domain document object detection: Benchmark suite and method. In Proceedings of the IEEE/CVF Conference on Computer Vision and Pattern Recognition. 12915-12924.

Minghao Li, Yiheng Xu, Lei Cui, Shaohan Huang, Furu Wei, Zhoujun Li, and Ming Zhou. 2020. DocBank: A Benchmark Dataset for Document Layout Analysis. In Proceedings of the 28th International Conference on Computational Linguistics. International Committee on Computational Linguistics, Barcelona, Spain (Online), 949-960. https://doi.org/10.18653/v1/2020.coling-main.82.

Yulin Li, Yuxi Qian, Yuechen Yu, Xiameng Qin, Chengquan Zhang, Yan Liu, Kun Yao, Junyu Han, Jingtuo Liu, and Errui Ding. 2021. StrucTexT: Structured Text Understanding with Multi-Modal Transformers. In Proceedings of the 29th ACM International Conference on Multimedia. 1912-1920.

Minghui Liao, Baoguang Shi, Xiang Bai, Xinggang Wang, and Wenyu Liu. 2017. TextBoxes: A Fast Text Detector with a Single Deep Neural Network. In AAAl.

Ze Liu, Yutong Lin, Yue Cao, Han Hu, Yixuan Wei, Zheng Zhang, Stephen Lin, and Baining Guo. 2021. Swin transformer: Hierarchi-

(56) References Cited

OTHER PUBLICATIONS cal vision transformer using shifted windows. In Proceedings of the IEEE/CVF International Conference on Computer Vision. 10012-10022.

Tomas Mikolov, Ilya Sutskever, Kai Chen, Greg S Corrado, and Jeff Dean. 2013. Distributed representations of words and phrases and their compositionality. In Advances in neural information processing systems. 3111-3119.

Tom Murray. 1999. Authoring Intelligent Tutoring Systems: An analysis of the state of the art.

Lawrence O'Gorman. 1993. The document spectrum for page layout analysis. IEEE Transactions on pattern analysis and machine intelligence 15, 11 (1993), 1162-1173.

Xiaobao Peng, Zhijian Yin, and Zhen Yang. 2020. Deeplab_v3_plus-net for Image Semantic Segmentation with Channel Compression. 2020 IEEE 20th International Conference on Communication Technology (ICCT) (2020), 1320-1324.

Rafal Powalski, Łukasz Borchmann, Dawid Jurkiewicz, Tomasz Dwojak, Michal Pietruszka, and Gabriela Pałka. 2021. Going Full-TILT Boogie on Document Understanding with Text-Image-Layout Transformer. In ICDAR.

W. M. Rand. 1971. Objective Criteria for the Evaluation of Clustering Methods. J. Amer. Statist. Assoc. 66 (1971), 846-850.

Nils Reimers and Iryna Gurevych. 2019. Sentence-bert: Sentence embeddings using siamese bert-networks. arXiv preprint arXiv:1908.10084 (2019).

Shaoqing Ren, Kaiming He, Ross B. Girshick, and Jian Sun. 2015. Faster RCNN: Towards Real-Time Object Detection with Region Proposal Networks. IEEE Transactions on Pattern Analysis and Machine Intelligence 39 (2015), 1137-1149.

Anikó Simon, Jean-Christophe Pret, and A. Peter Johnson. 1997. A Fast Algorithm for Bottom-Up Document Layout Analysis. IEEE Trans. Pattern Anal. Mach. Intell. 19 (1997), 273-277.

Ray Smith. 2007. An overview of the Tesseract OCR engine. In Ninth international conference on document analysis and recognition (ICDAR 2007), vol. 2. IEEE, 629-633.

Robert Endre Tarjan and Anthony E Trojanowski. 1977. Finding a maximum independent set. SIAM J. Comput. 6, 3 (1977), 537-546.

Zilong Wang, Yiheng Xu, Lei Cui, Jingbo Shang, and Furu Wei. 2021. LayoutReader: Pre-training of Text and Layout for Reading Order Detection. In Proceedings of the 2021 Conference on Empirical Methods in Natural Language Processing. Association for Computational Linguistics, Online and Punta Cana, Dominican Republic, 4735-4744. https://doi.org/10.18653/v1/2021.emnlp-main.389.

Zilong Wang, Mingjie Zhan, Xuebo Liu, and Ding Liang. 2020. DocStruct: A Multimodal Method to Extract Hierarchy Structure in Document for General Form Understanding. In Findings of the Association for Computational Linguistics: EMNLP 2020. Association for Computational Linguistics, Online, 898-908. https://doi.org/10.18653/v1/2020.findingsemnlp.80.

Zilong Wang, Mingjie Zhan, Houxing Ren, Zhaohui Hou, Yuwei Wu, Xingyan Zhang, and Ding Liang. 2021. GroupLink: An End-to-end Multitask Method for Word Grouping and Relation Extraction in Form Understanding. ArXiv abs/2105.04650 (2021).

Ronald J. Williams and David Zipser. 1989. A Learning Algorithm for Continually Running Fully Recurrent Neural Networks. Neural Comput. 1, 2 (Jun. 1989), 270-280. https://doi.org/10.1162/neco.1989.1.2.270.

Yuxin Wu, Alexander Kirillov, Francisco Massa, Wan-Yen Lo, and Ross Girshick. 2019. Detectron2. https://github.com/facebookresearch/detectron2.

Yiheng Xu, Minghao Li, Lei Cui, Shaohan Huang, Furu Wei, and Ming Zhou. 2020. Layoutlm: Pre-training of text and layout for document image understanding. In Proceedings of the 26th ACM SIGKDD International Conference on Knowledge Discovery & Data Mining. 1192-1200.

Yang Xu, Yiheng Xu, Tengchao Lv, Lei Cui, Furu Wei, Guoxin Wang, Yijuan Lu, Dinei A. F. Florencio, Cha Zhang, Wanxiang Che, Min Zhang, and Lidong Zhou. 2021. LayoutLMv2: Multi-modal Pre-training for Visually-Rich Document Understanding. In ACL/IJCNLP.

Xiao Yang, Ersin Yumer, Paul Asente, Mike Kraley, Daniel Kifer, and C. Lee Giles. 2017. Learning to Extract Semantic Structure from Documents Using Multimodal Fully Convolutional Neural Networks. 2017 IEEE Conference on Computer Vision and Pattern Recognition (CVPR) (2017), 4342-4351.

Peng Zhang, Yunlu Xu, Zhanzhan Cheng, Shiliang Pu, Jing Lu, Liang Qiao, Yi Niu, and Fei Wu. 2020. Trie: End-to-end text reading and information extraction for document understanding. In Proceedings of the 28th ACM International Conference on Multimedia. 1413-1422.

Xiaoyi Zhang, Lilian de Greef, Amanda Swearngin, Samuel White, Kyle Murray, Lisa Yu, Qi Shan, Jeffrey Nichols, Jason Wu, Chris Fleizach, et al. 2021. Screen Recognition: Creating Accessibility Metadata for Mobile Applications from Pixels. In Proceedings of the 2021 CHI Conference on Human Factors in Computing Systems. 1-15.

Yue Zhang, Bo Zhang, Rui Wang, Junjie Cao, Chen Li, and Zuyi Bao. 2021. Entity Relation Extraction as Dependency Parsing in Visually Rich Documents. arXiv preprint arXiv:2110.09915 (2021).

\* cited by examiner

| 9. Type Of Customs Records | |
|---|---|
| 9.1: Specify Type Of Records | |
| 10. Additional Information | |
| 10.1: Additional Information And General Remarks: | |
| 11. Others | | |
|---|---|---|
| 11.1: Consent For Publication In The List Of Authorization Holders: | ☐ Yes | ☐ No |
| 11.2: Signature Of Applicant: | | |
| 11.3: Place At Which Application Was Signed Or Otherwise Authenticated: | 11.4: Date: | |

*Fig. 7B*

| 9. Type Of Customs Records | |
|---|---|
| 9.1: Specify Type Of Records | |
| 10. Additional Information | |
| 10.1: Additional Information And General Remarks: | |
| 11. Others | |
| 11.1: Consent For Publication In The List Of Authorization Holders: | ☐ Yes   ☐ No |
| 11.2: Signature Of Applicant: | |
| 11.3: Place At Which Application Was Signed Or Otherwise Authenticated: | 11.4: Date: |

*Fig. 7C*

| 9. Type Of Customs Records | |
|---|---|
| 9.1: Specify Type Of Records | |
| 10. Additional Information | |
| 10.1: Additional Information And General Remarks: | |

| 11. Others | | |
|---|---|---|
| 11.1: Consent For Publication In The List Of Authorization Holders: | ☐ Yes | ☐ No |
| 11.2: Signature Of Applicant: | | |
| 11.3: Place At Which Application Was Signed Or Otherwise Authenticated: | 11.4: Date: | |

*Fig. 7D*

| 9. Type Of Customs Records | |
|---|---|
| 9.1: Specify Type Of Records | |
| 10. Additional Information | |
| 10.1: Additional Information And General Remarks: | |
| 11. Others | |
| 11.1: Consent For Publication In The List Of Authorization Holders: | ☐ Yes ☐ No |
| 11.2: Signature Of Applicant: | |
| 11.3: Place At Which Application Was Signed Or Otherwise Authenticated: | 11.4: Date: |

*Fig. 7E*

EXTRACTING DOCUMENT HIERARCHY USING A MULTIMODAL, LAYER-WISE LINK PREDICTION NEURAL NETWORK

BACKGROUND

Recent years have seen significant improvements in software and hardware platforms for parsing digital documents to determine document structure and content. For example, in this technological field certain models can automatically identify text, tables, layouts, or regions of interest within a document. However, commonly used documents, such as forms, invoices, and contracts have rich document layouts featuring hierarchical structures like checkbox groupings and irregular tables. Accordingly, in the field of digital document analysis and layout extraction, a number of technical problems exist in relation to accuracy, efficiency, and flexibility of implementing computing devices.

BRIEF SUMMARY

Embodiments of the present disclosure provide benefits and/or solve one or more of the foregoing or other problems in the art with systems, non-transitory computer-readable media, and methods that utilize a multi-modal, layer-wise link prediction machine learning model to generate a document hierarchy from multimodal contextual input of a digital document image. For instance, the disclosed systems utilize visual features, textual semantics, and spatial coordinates along with constraint inference to extract the hierarchical layout structure of documents in a bottom-up layer-wise fashion. The disclosed systems recursively group smaller regions into larger semantic elements in 2-dimensions to infer complex nested hierarchies. Indeed, the disclosed systems outperform baseline approaches by ten to fifteen percent for the tasks of spatial region classification, higher-order group identification, layout hierarchy extraction, reading order, and word grouping.

Additional features and advantages of one or more embodiments of the present disclosure are outlined in the description which follows and, in part, will be obvious from the description or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 7A-7E illustrate generating example digital document hierarchies for digital document images in accordance with one or more embodiments.

DETAILED DESCRIPTION

Figure 1:
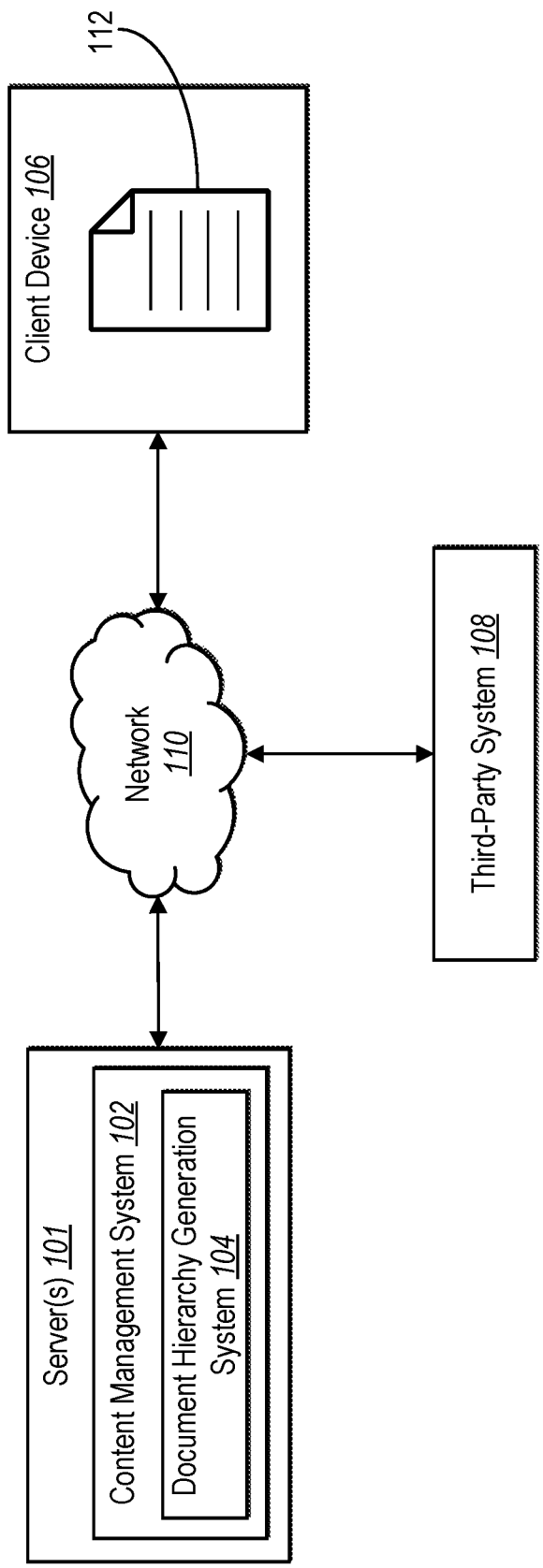
FIG. 1 illustrates a diagram of an environment in which a document hierarchy generation system can operate in accordance with one or more embodiments.

This disclosure describes one or more embodiments of a document hierarchy generation system that utilizes a deep learning-based multimodal model to generate a document hierarchy utilizing layer-wise analysis. Existing document analysis systems have a number of problems in relation to accuracy, efficiency, and flexibility of operation. Indeed, parsing visually-rich documents that contain images and scanned text is challenging because most documents do not encode explicit layout information (e.g., how characters and words are grouped into boxes and ordered into larger semantic entities).

For instance, existing systems are inflexible because they often account for only certain types of input or elements when analyzing documents. Specifically, existing systems utilize features keyed to particular elements or rely specifically on text to predict relationships and assign labels. Other existing systems focus on specific detection tasks, such as table detection, using loose spatial rules filtered by convolutional neural networks. Indeed, by focusing on certain features or elements of a document, existing systems can provide information about only portions of documents and offer, at best, an incomplete hierarchy of a document.

Moreover, existing systems are inaccurate. For example, some systems are built to account for only certain elements when analyzing documents. Such systems fail to accurately identify hierarchies for documents that include a variety of different visual elements. Similarly, some systems analyze certain, limited document features, which causes them to miss crucial contextual aspects indicating how documents are pieced together. Thus, existing systems often cannot account for unique multimodal feature interactions to generate accurate document hierarchies. For example, conventional systems often fail to disambiguate closely spaced structures due to low resolution. Accordingly, conventional systems often include inaccuracies when generating a hierarchy of a document as a whole.

Some conventional systems are also inaccurate when identifying textual elements because they rely on word sequences having the correct reading order. For example, existing systems use optical character recognition (OCR) to model text to solve sequence labeling and classification tasks based on word sequences in generalized reading order. However, reading order is generally dependent on the structure of the document, so reading in an unorganized manner leads existing systems to incorrectly group document elements. This inaccuracy is exacerbated when presented with visually rich documents with complex spatial structures involving multiple columns, tables, figures, and non-aligned text blocks, commonly found in ubiquitous forms, invoices, contracts, and interfaces. Thus, errors in OCR reading can scramble text, leading to errors in successive determinations that rely on correct reading order.

Moreover, existing systems are inaccurate because they cannot parse spatial structure from ubiquitous digital documents. For example, PDF documents generally discard most structure and encode only low-level text and graphic information, while document images produced by a scanner or mobile phone scan app are stored in rasterized format (e.g., pixels). However, neither format encodes spatial structure explicitly to identify which pieces of text belong together. Because existing systems rely on the reading order of text, this leads to significant inaccuracies when attempting to produce document hierarchies or determine element types.

Conventional systems are also inefficient to implement. For example, document hierarchies that fail to accurately reflect document layout and content lead to increased user interactions, user interfaces, and processing power to correct downstream tasks such as document conversion or correction. Thus, conventional systems not only lead to inaccurate and inflexible results but require additional time and computer resources to implement within overall document management systems.

In contrast, the document hierarchy generation system utilizes a multimodal layer-wise link prediction machine learning model to identify document elements and generate a digital document hierarchy. For instance, in one or more embodiments, the document hierarchy generation system uses multimodal deep learning on visual features, textual semantics and spatial geometry as well as constraint inference to generate a complete bottom-up ordered hierarchical arrangement of document layout structure. Within this hierarchy, each node can include a region defining a visual element which is assigned a semantic label, with the leaf nodes comprising OCR tokens or embedded images or graphics. The document hierarchy generation system generates this structure in a layer-wise fashion: given an input set of regions, the document hierarchy generation system hypothesizes candidate 2D groupings of these regions without the need for Inside-outside-beginning ("IOB") tagging, evaluates candidate parent-child links between a child region and parent region, then commits to a global parent-child assignment through constraint optimization. This multi-modal approach benefits not only those cases where spatial signals are effective but also where visual and textual signals are needed.

To illustrate, in one or more embodiments, the document hierarchy generation system determines child visual elements (e.g., child boxes) in the documents in the first layer and selects parent visual elements (e.g., parent boxes) based on link probabilities between the parent visual elements and the child visual elements. Parent visual elements are then utilized as child visual elements in the next layer, recursively selecting parent visual elements based on link probabilities (e.g., until only one parent visual element remains). Moreover, the document hierarchy generation system selects optimal parent visual elements utilizing cost metrics and a corresponding optimization model (e.g., greedy optimization or global optimization).

As mentioned above, the document hierarchy generation system generates feature embeddings from a digital document image. For example, the document hierarchy generation system extracts multimodal information from a digital document image for generating feature embeddings. In some embodiments, the document hierarchy generation system generates feature embeddings from spatial, textual, or structural elements in the digital document image.

For instance, the document hierarchy generation system uses spatial elements of the digital document image by using positional coordinates of visual elements within the digital document image to generate spatial feature embeddings. Further, in some embodiments, the document hierarchy generation system uses structural elements of the digital document image to generate feature embeddings. For instance, in some embodiments, the document hierarchy generation system generates structural embeddings from element classifications of visual elements extracted from the digital document image. Moreover, in some embodiments, the document hierarchy generation system utilizes a visual encoder to generate a visual feature embedding from a digital document image.

As also mentioned above, in some embodiments, the document hierarchy generation system uses text elements to generate feature embeddings. For example, in some embodiments, the document hierarchy generation system extracts text from visual text elements in a digital document image and uses a trained natural language processing model to generate semantic feature embeddings from the extracted text. The document hierarchy generation system further uses these semantic feature embeddings to generate element classifications for the candidate parent visual elements and the parent-child element link probabilities.

Additionally, as previously mentioned, the document hierarchy generation system can generate parent-child link probabilities from these various feature embeddings utilizing a neural network. For example, the document hierarchy generation system uses a neural network that includes a multimodal transformer encoder to analyze spatial embeddings, textual embeddings, structural embeddings, and/or visual feature embeddings. In some embodiments, the document hierarchy generation system utilizes the multimodal transformer encoder to generate parent vector representations and child vector representations from the feature embeddings and then uses a first neural network layer (e.g., a convolutional layer, fully connected layer, transformer layer, or other layer) of the neural network to generate the parent-child link probabilities. Moreover, in one or more embodiments, the document hierarchy generation system utilizes a second neural network layer (e.g., second convolutional layer, fully connected layer, transformer layer, or other layer) to generate element classifications from the parent vector representations.

As further mentioned above, in some implementations the document hierarchy generation system selects parent visual elements from the candidate parent visual elements based on the parent-child link probabilities. In some embodiments, the document hierarchy generation system determines cost metrics (e.g., a parent rank score) from the parent-child link probabilities and other features and compares the cost metrics to select the parent visual elements from the candidate visual elements. In some instances, the document hierarchy generation system generates cost metrics from the visual element sizes of the candidate parent visual elements and the child visual elements. Furthermore, in even more embodiments, the document hierarchy generation system applies spatial constraints to identify particular visual elements that encompass one or more visual elements.

The document hierarchy generation system can also utilize a hierarchy for a variety of additional tasks. For example, the document hierarchy generation system can utilize a hierarchy in converting a scanned form into an interactive digital format. Thus, for example, the document hierarchy generation system can extract characters/words, group them into larger visual elements (e.g., a child choice label), and further group them into larger elements (e.g., a parent choice group with the child choice label and a child checkbox). The document hierarchy generation system can thus generate an interactive digital document from a scanned digital image based on the generated hierarchy by providing interactive operability between elements based on child-parent relationships. In addition to authoring digital documents, the document hierarchy generation system can utilize a hierarchy for re-flowability across devices, adaptive editing of semi-structured documents and user-interfaces, and improving accessibility for user-interactions. The document hierarchy generation system can also utilize a generated hierarchy for producing sequences with accurate reading order as input to other (e.g., NLP) models that depend on accurate sequencing. Indeed, once the document hierarchy generation system extracts the hierarchical structure of a digital document image, the document hierarchy generation system can traverse the structure to produce reading order that respects group structure and avoids errors of conventional OCR algorithms.

In one or more implementations, the document hierarchy generation system trains a neural network to generate document classifications and parent-child element links for digital document images. For instance, the document hierarchy generation system uses a training dataset comprising a digital document image portraying a plurality of visual elements and further including ground-truth parent-child relationships and ground-truth element classifications and uses that dataset to generate predicted element classifications and predicted parent-child element links. In some instances, the document hierarchy generation system modifies the parameters of the neural network by comparing the predicted element classifications with the ground truth classifications and comparing the parent-child element links with the ground truth parent-child element relationships. In some embodiments, the document hierarchy generation system modifies the parameters of the neural network based on an element classification loss comparing the predicted element classifications with the ground truth element classifications and a parent-child link loss comparing the predicted parent-child element links with the ground-truth parent-child element relationships.

The document hierarchy generation system provides many advantages and benefits over other systems and methods. For example, the document hierarchy generation system can improve flexibility over other systems through a multi-modal method of utilizing visual and textual elements of digital document images to generate a document hierarchy. In particular, in one or more embodiments, the document hierarchy generation system utilizes a neural network having a multimodal transformer encoder that generates visual element embeddings based on a variety of different features extracted from a digital document image. Accordingly, the document hierarchy generation system can extract layout structure from diverse, generic, and complex documents to flexibly determine elements present in the layout structure based on a variety of input features. Indeed, the document hierarchy generation system can flexibly adapt to the hierarchy, elements, and features across different documents.

In one or more implementations, the document hierarchy generation system also generates more accurate document hierarchies relative to conventional systems. As mentioned above, the document hierarchy generation system can account for structural, textual, and special elements of a digital document image utilizing a machine learning approach and iteratively select from parent elements in a layer-wise fashion. Utilizing this approach, the document hierarchy generation system can generate complete and accurate digital hierarchies of complex documents relative to existing systems.

In one or more embodiment, the document hierarchy generation system also improves accuracy because it accounts for structural elements of the document rather than relying on the reading order of the text. Instead, by accounting for structural elements (and other contextual features), the document hierarchy generation system can make decisions about relationships of text that existing systems are unable to identify. Indeed, the document hierarchy generation system shows improvements in classifying elements, identifying groups, and in constructing the overall document hierarchy. Specifically, comparing scores of the document hierarchy generations system with baselines and ablative components for iteratively selecting from parent elements (e.g., identifying elements) and in element classification (e.g., group identifying), the document hierarchy generation system outperforms baselines for other systems. Furthermore, ablation analysis shows that each input from each modality (e.g., spatial, structural, and textual) contributes to the overall performance.

Moreover, the document hierarchy generation system is more efficient because it reduces computing resources and time needed for a variety of downstream tasks. For example, conventional systems require significant time and resources to author interactive digital documents from digital document images. Indeed, conventional systems require significant user interactions to identify elements and their inter-relationships and then identify pertinent functionality. In contrast, the document hierarchy generation system can efficiently and quickly develop a document hierarchy and generate an interactive digital document image with functionality between the detected elements (e.g., functional grouped radio buttons, text entry elements, etc.). The document hierarchy generation system can significantly reduce time, user interactions, and computing resources utilized in authoring interactive digital documents (e.g., from scanned images) and for a variety of additional tasks (e.g., re-flowability across devices, adaptive editing of semi-structured documents and user-interfaces). As mentioned above, the document hierarchy generation system can also utilize hierarchy to determine reading order that respects group structure, improving NLP models (e.g., training of NLP models) and avoiding reading order errors of conventional OCR algorithms.

Thus, in one or more embodiments, the document hierarchy generation system 104 utilizes a neural network that takes raw documents and OCR extracted text as inputs and outputs a spatial hierarchy by grouping lower-level elements into parent boxes, predicting parent-child links and the element type of the parent boxes. The model operates on one layer at a time, considering all child boxes $c_i$ in one layer and candidate parent-boxes $p_j$ in the next layer. The model encodes the visual, textual, and spatial features of each element into a sequence to compute an encoding, which is then used for link prediction and element type classification. Candidate parents are generated using the child-boxes $c_i$, the final parent set is selected via constraint optimization, and the model is applied recursively to build the hierarchy bottom-up.

Additional detail regarding the document hierarchy generation system will now be provided with reference to the figures. In particular, FIG. 1 illustrates a block diagram of a system environment for implementing a document hierarchy generation system 104 in accordance with one or more embodiments. As shown in FIG. 1, the environment includes server(s) 101 implementing the document hierarchy generation system 104 as part of a content management system 102. The environment of FIG. 1 further includes client device 106 and third-party system 108. The server(s) 101 can include one or more computing devices to implement the document hierarchy generation system 104. Additional description regarding the illustrated computing devices (e.g., the server(s) 101, the client device 106, and the network 110) is provided with respect to FIG. 10 below.

In one or more implementations, the client device 106 includes a client application. In particular, the client application can include a web application, a native application installed on the client device 106 (e.g., a mobile application, a desktop application, etc.), or a cloud-based application where all or part of the functionality is performed by the server(s) 101. Based on instructions from the client application, the client device 106 presents or displays information to a user such as a digital document image 112. In some cases, the client application includes all or part of the document hierarchy generation system 104.

As illustrated in FIG. 1, the environment includes the server(s) 101. The server(s) 101 generates, tracks, stores, processes, receives, and transmits electronic data, such as digital document images. For example, the server(s) 101 receives data from the client device 106 in the form of an indication of the digital document image 112. In response, the server(s) 101 generates a digital document hierarchy and transmits data to the client device 106 (e.g., to cause the client device 106 to display or present an interactive digital document image).

As shown, the document hierarchy generation system 104 utilizes a network 110 to communicate with the client device 106 and the third-party system 108. The network 110 may comprise a network described in FIG. 10. For example, the document hierarchy generation system 104 communicates with client device 106 to provide and receive information pertaining to digital documents. Indeed, the content management system 102 or the document hierarchy generation system 104 can receive a digital document (e.g., a scan, a PDF, or other digital image) and generate/provide a digital document hierarchy for the digital document.

In some embodiments, the content management system 102 or the document hierarchy generation system 104 communicates with a third-party system 108 (e.g., via network 110) to identify visual elements from a digital document image. For example, the content management system 102 or the document hierarchy generation system 104 communicates with the third-party system 108 to extract text or identify positional coordinates from the digital document image.

In one or more embodiments, the server(s) 101 includes all, or a portion of, the document hierarchy generation system 104. For example, the document hierarchy generation system 104 operates on the server(s) 101 to generate and provide digital document hierarchies and/or interactive digital documents. In some cases, the document hierarchy generation system 104 utilizes a machine learning model such as a neural network to generate digital document hierarchies. In addition, the document hierarchy generation system 104 includes or communicates with a neural network for training.

In certain cases, the client device 106 includes all or part of the document hierarchy generation system 104. For example, the client device 106 generates, obtains (e.g., downloads), or utilizes one or more aspects of the document hierarchy generation system 104 from the server(s) 101. Indeed, in some implementations, the document hierarchy generation system 104 is located in whole or in part on the client device 106. For example, the document hierarchy generation system 104 includes a web hosting application that allows the client device 106 to interact with the server(s) 101. To illustrate, in one or more implementations, the client device 106 accesses a web page supported and/or hosted by the server(s) 101.

In one or more embodiments, the client device 106 and the server(s) 101 work together to implement the document hierarchy generation system 104. For example, in some embodiments, the server(s) 101 train one or more neural networks discussed herein and provide the one or more neural networks to the client device 106 for implementation. In some embodiments, the server(s) 101 train one or more neural networks, the client device 106 requests a digital document hierarchy, and the server(s) 101 generate a digital document hierarchy utilizing the one or more neural networks. Furthermore, in some implementations, the client device 106 assists in training one or more neural networks.

Although FIG. 1 illustrates the environment having a particular number and arrangement of components associated with the document hierarchy generation system 104, in some embodiments, the environment may include more or fewer component with varying configurations. For example, in some embodiments, the content management system 102 or the document hierarchy generation system 104 can communicate directly to the client device 106, bypassing the network 110. In these or some embodiments, the content management system 102 or the document hierarchy generation system 104 can be housed (entirely or in part) on the client device 106. Additionally, the content management system 102 or the document hierarchy generation system 104 can communicate with a third-party system 108 to identify visual elements from a document image.

Figure 2:
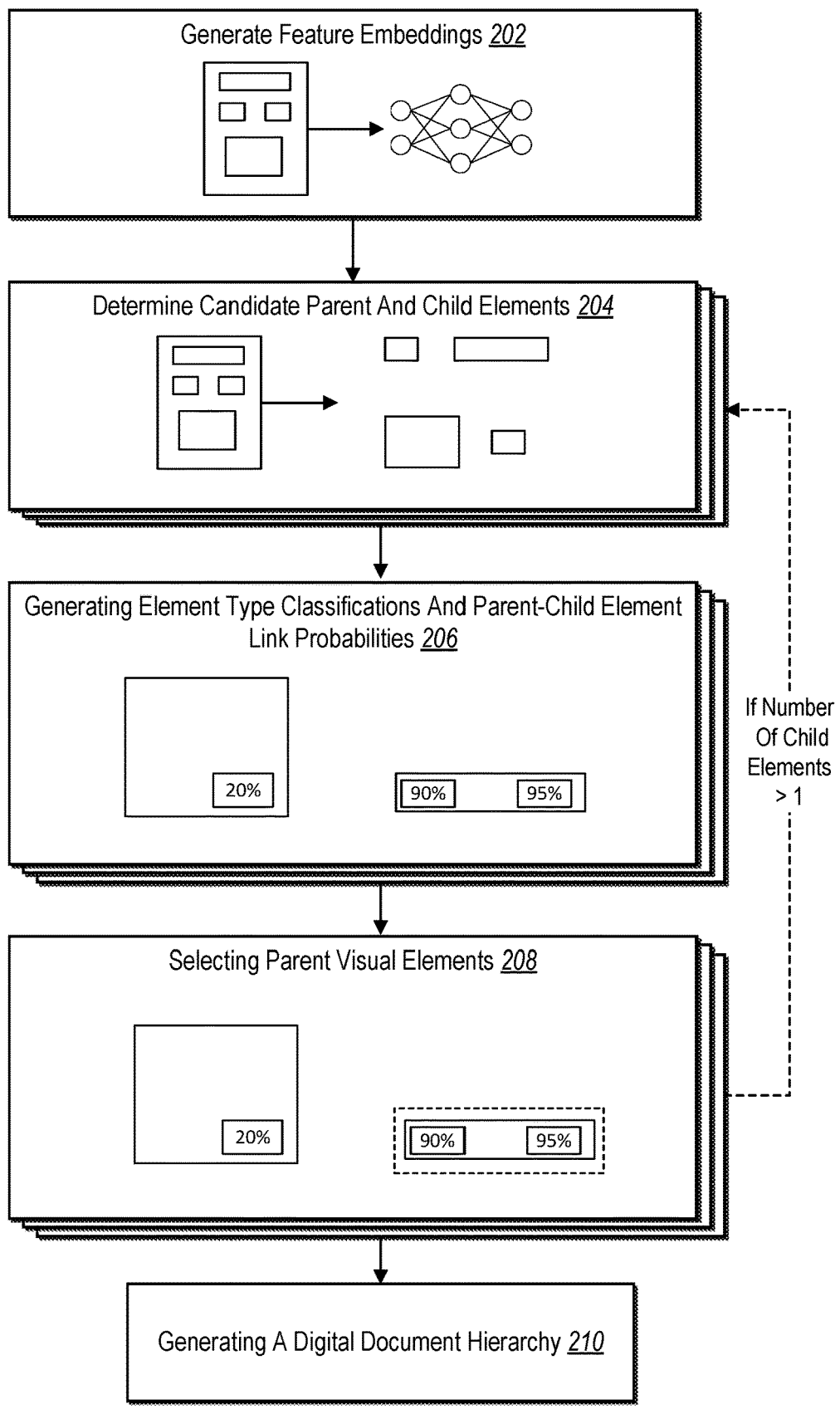
FIG. 2 illustrates a schematic diagram of iteratively grouping elements to generate a document hierarchy in accordance with one or more embodiments.

Turning now to FIG. 2, additional description is provided regarding the document hierarchy generation system 104 analyzing a digital document image to generate a document hierarchy. More specifically, FIG. 2 illustrates an overview of a sequence of acts for generating feature embeddings and iteratively determining parent and child elements to generate a digital document hierarchy.

As illustrated in FIG. 2, the document hierarchy generation system 104 performs an act 202 of generating feature embeddings. For instance, the document hierarchy generation system 104 can extract visual elements from the digital document image and generate feature embeddings from the visual elements. To illustrate, in one or embodiments, the document hierarchy generation system 104 utilizes an optical character recognition algorithm to extract boxes defining potential visual elements in a digital document image. The document hierarchy generation system 104 can utilize a variety of OCR algorithms. In some implementations, the document hierarchy generation system 104 uses Tesseract OCR.

Moreover, in some embodiments, the document hierarchy generation system 104 utilizes an object detector machine learning model to identify visual elements. For instance, the document hierarchy generation system 104 can utilize an object detector trained to extract embedded icons, widgets, or other visual elements. The document hierarchy generation system 104 can utilize a variety of object detector architectures or algorithms. In one or more implementations, the document hierarchy generation system 104 utilizes a Detectron2 object detector.

In some implementations, the document hierarchy generation system 104 utilizes a machine learning model to generate feature embeddings from a digital document image.

In some implementations, a digital document image is a digital file comprising visual elements having an image and/or text. For example, a digital document image can include a scanned image having pixels that portray visual elements such as text, images, buttons, or menus. Similarly, a digital document image can include a PDF portraying visual elements. In some implementations, visual elements of a digital document image are not editable or interactive. For example, in some implementations visual elements of a digital document image are not moveable, editable, or manipulable (e.g., scanned radio buttons or text cannot be reorganized to accommodate a different display screen or device type). To illustrate, text in a scanned image cannot be directly edited as text unless further processed using one or more computer-implemented algorithms.

As indicated, the document hierarchy generation system 104 extracts visual elements from a digital document image and uses the visual elements to generate feature embeddings. For example, visual elements include graphical components, items, or portions of a digital document image. To illustrate, visual elements include graphical components such as text, images, buttons, tables, menus, fields, or columns. In some implementations, the document hierarchy generation system utilizes boxes or other shapes (e.g., bounding shapes) to define visual elements. For example, document hierarchy generation system determines a visual element by extracting a bounding box representing the visual element. To illustrate, in some implementations, the document hierarchy generation system represents visual elements as words and bounding box coordinates (e.g., OCR tokens generated utilizing an optical character recognition model).

Furthermore, feature embeddings include digital representations (e.g., digital characters, vectors, or numerical representations) of visual elements. For instance, a feature embedding can include characteristics of visual elements generated utilizing computer-implemented model (e.g., one-hot encoding or a machine-learning model). To illustrate, a feature embedding can include a feature vector generated utilizing a neural network encoder.

In some embodiments, the document hierarchy generation system 104 extracts visual elements directly from the digital document image to generate feature embeddings. In particular, the document hierarchy generation system 104 extracts spatial and textual elements directly from a digital document image. For example, in some embodiments, the document hierarchy generation system 104 utilizes a high precision object detector and optical character recognition (OCR) to identify tokens (e.g., textual, visual) in the digital document image. In some embodiments, the document hierarchy generation system 104 utilizes a pre-trained natural language processing model to encode the text content from the digital document image.

In one or more embodiments, the document hierarchy generation system 104 generates various types of embeddings from extracted visual elements. For instance, the document hierarchy generation system 104 generates feature embeddings by generating spatial feature embeddings. In some embodiments, the document hierarchy generation system 104 uses positional coordinates from the extracted tokens of the digital document image to generate spatial feature embeddings. For example, spatial feature embeddings are vectors or numerical representations that indicate the positions of visual elements of a digital document.

In some embodiments, the document hierarchy generation system 104 generates feature embeddings by generating structural feature embeddings. More specifically, the document hierarchy generation system 104 uses structural elements of the digital document image to generate structural feature embeddings. For example, the document hierarchy generation system 104 uses generated element classifications of the extracted visual elements (e.g., from a previous layer or object detector) and generates structural embeddings from the element classifications. For example, structural feature embeddings include vectors or numerical representations of the element classifications (e.g., categorical numerical representations or encodings generated by a machine learning model).

In additional embodiments, the document hierarchy generation system 104 generates visual feature embeddings. More specifically, the document hierarchy generation system 104 utilizes a visual encoder (e.g., a pretrained neural network encoder) to generate a visual feature embedding. For example, visual feature embeddings are vectors or numerical representations that represent visual characteristics of a digital document image (or a visual element). Accordingly, visual feature embeddings include a feature map of a digital document image (or visual element) encoded by a machine-learning model such as a visual encoder. The document hierarchy generation system 104 can utilize a variety of visual encoder architectures or algorithms. In some implementations, the document hierarchy generation system 104 utilizes a convolutional neural network as a visual encoder to extract visual cues.

Moreover, in some embodiments, the document hierarchy generation system 104 generates semantic feature embeddings. More specifically, the document hierarchy generation system 104 utilizes tokens extracted using OCR as input for a trained natural language processing model to generate semantic feature embeddings. For example, semantic feature embeddings are feature embeddings that reflect semantic meaning of text in a digital document image. For example, semantic feature embeddings include a vector of semantic features generated by a machine learning model, such as a neural network. The document hierarchy generation system 104 can utilize a variety of language machine learning models. For example, in one or more embodiments, the document hierarchy generation system 104 utilizes the language machine learning model described by Nils Reimers and Iryna Gurevych in Sentence-bert: Sentence embeddings using siamese bert-networks, arXiv preprint arXiv:1908.10084 (2019) (hereinafter SBert). Additional detail regarding extracting visual elements and generating feature embeddings is provided with respect to FIG. 3 below.

As further shown in FIG. 2, the document hierarchy generation system 104 performs an act 204 of determining candidate parent and child elements. In particular, the document hierarchy generation system 104 determines candidate parent and child elements by hypothesizing feasible parent visual elements for the child elements. In one or more embodiments, parent visual elements refer to visual elements of a document that include, encompass, utilize, and/or associate with one or more additional visual elements in a digital document. For example, a parent visual element can include a selection element that includes a radio button and a text element for receiving a user selection. The selection element can be a parent visual element that includes, encompasses, and/or utilizes multiple child visual elements (i.e., the radio button and text element).

As mentioned, the document hierarchy generation system 104 can select a parent visual element relative to a layer of child visual elements in a document hierarchy. In one or more embodiments, a "candidate parent visual element" refers to a visual element that is considered or analyzed to determine if it is a parent visual element. Moreover, child visual elements refer to visual elements utilized by, associated with, encompassed by, or included within a parent visual element. As mentioned, the document hierarchy generation system can select a parent visual element relative to a layer of child visual elements in a document hierarchy. Additional description regarding determining candidate parent and child elements is provided below (e.g., with respect to FIG. 3).

In one or more implementations, the document hierarchy generation system 104 performs the act 204 by comparing visual element sizes (e.g., box sizes). For example, the document hierarchy generation system 104 can identify geometrically feasible parent visual elements relative to other child elements. For example, the document hierarchy generation system 104 can identify a candidate parent element by determining that coordinates of the candidate parent element encompass one or more other visual elements (i.e., child visual elements). Thus, of a visual element geographically encompasses six other visual elements, the document hierarchy generation system 104 can identify the visual element as a candidate parent visual element relative to the six child visual elements.

As further illustrated in FIG. 2, in some embodiments, the document hierarchy generation system 104 performs an act 206 of generating element type classifications and parent-child element link probabilities. In one or more embodiments, element classifications refer to a label, type, or name assigned to a visual element. For example, a neural network can generate or assign element classifications for candidate parent visual elements (or selected parent visual elements). Thus, for example, an element classification can include a text block, choice group, table, or field. In one or more embodiments, parent-child element link probabilities are values or metrics indicating a probability or likelihood that a first visual element is a parent visual element relative to another visual element (i.e., a child visual element).

In certain embodiments, document hierarchy generation system 104 utilizes machine learning to generate element classifications for the candidate parent visual elements and parent-child element link probabilities. For example, machine learning model, refers to a computer algorithm or a collection of computer algorithms that can be trained and/or tuned based on inputs to approximate unknown functions. As another example, a machine learning model can include a computer algorithm with branches, weights, or parameters that change based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

In some embodiments, document hierarchy generation system 104 utilizes a neural network to generate element classifications for the candidate parent visual elements and parent-child element link probabilities. For example, neural network refers to a machine learning model of interconnected artificial neurons (e.g., organized in layers) that communicate and learn to approximate complex functions and generate outputs based on a plurality of inputs provided to the neural network. In some cases, a neural network refers to an algorithm (or set of algorithms) that implements deep learning techniques to model high-level abstractions in data. For example, a neural network includes a multi-layer perceptron, a transformer neural network, a convolutional neural network, a recurrent neural network (e.g., an LSTM), a graph neural network, or a generative adversarial neural network In certain embodiments, document hierarchy generation system 104 uses a neural network that includes a multimodal transformer encoder to analyze spatial feature embeddings, semantic feature embeddings, visual feature embeddings and/or structural feature embeddings. For example, in some embodiments, the multimodal transformer encoder refers to a transformer encoder including a plurality of transformer neural network layers. Specifically, the plurality of transformer neural network layers encode the spatial feature embeddings, semantic feature embeddings, visual feature embeddings, and structural feature embeddings to generate element classifications and/or parent-child element link probabilities. For example, a transformer neural network encoder includes a plurality of feature encoding layers that include a self-attention layer and a feedforward neural network layer for capturing context information (e.g., without recurrence and convolution layers). For example, in one or more embodiments, a transformer neural network encoder includes a transformer architecture as described by A Vaswani, N. Shazeer, N. Parmar, J. Uszkoreit, L. Jones, A. Gomez, L Kaiser, and I. Polosukhin in *Attention Is All You Need*, arXiv:1706.03762 (2017), which is incorporated herein by reference in its entirety.

The document hierarchy generation system 104 can utilize a variety of different transformer architectures. For example, in some implementations, the document hierarchy generation system 104 utilizes LayoutLM or LayoutLMv2 transformers, as described by Yiheng Xu, Minghao Li, Lei Cui, Shaohan Huang, Furu Wei, and Ming Zhou in Layoutlm: Pre-training of text and layout for document image understanding, Proceedings of the 26th ACM SIGKDD International Conference on Knowledge Discovery & Data Mining. 1192-1200 (2020) and as described by Yang Xu, Yiheng Xu, Tengchao Lv, Lei Cui, Furu Wei, Guoxin Wang, Yijuan Lu, Dinei A. F. Florencio, Cha Zhang, Wanxiang Che, Min Zhang, and Lidong Zhou in LayoutLMv2: Multimodal Pre-training for Visually-Rich Document Understanding, ACL/IJCNLP (2021), which are incorporated herein by reference in their entirety.

In one or more implementations, the document hierarchy generation system 104 utilizes the multimodal transformer encoder to generate parent vector representations and child vector representations for the parent visual elements and child visual elements. In some embodiments, the document hierarchy generation system 104 utilizes a first neural network layer (e.g., a convolutional layer, transformer layer, or other layer) of the neural network to generate element classifications from the parent vector representations. Moreover, the document hierarchy generation system 104 utilizes a second neural network layer (e.g., a second convolutional layer, transformer layer, or other layer) of the neural network to generate child-link probabilities from the parent vector representations and the child vector representations. Additional description regarding generating parent-child element link probabilities and element classifications is provided below (e.g., with respect to FIG. 4).

As additionally illustrated in FIG. 2, in some embodiments the document hierarchy generation system 104 performs an act 208 of selecting parent visual elements. For example, in some embodiments, the document hierarchy generation system 104 selects parent visual elements by determining cost metrics from the parent-child element link probabilities and other features and selecting parent visual elements based on comparing the cost metrics. In some embodiments, the document hierarchy generation system 104 generates cost metrics from visual element sizes of the candidate parent visual elements and the child visual elements. Furthermore, in additional embodiments, the document hierarchy generation system 104 applies spatial constraints to identify particular visual elements that encompass one or more visual elements. Additional description regarding selecting parent visual elements is provided below (e.g., with respect to FIG. 5).

Moreover, as shown in FIG. 2, in some embodiments the document hierarchy generation system 104 iteratively repeats the acts 204, 206 and 208 until satisfying a stopping condition (e.g., until reaching a threshold number of iterations or there are no more child elements). For example, the document hierarchy generation system 104 utilizes feature embeddings from visual elements extracted directly from a digital document image (e.g., from OCR or NLP) as child elements in an initial layer when performing the act 204. The document hierarchy generation system 104 then utilizes parent visual elements selected in the act 208 as child elements in an additional layer (e.g., in performing the act 204 of a second layer). The document hierarchy generation system 104 iteratively repeats the process until satisfying the stopping condition. For example, FIG. 2 illustrates repeating until a single parent visual element is selected in the act 208 (e.g., there are no more possible parent elements).

As further illustrated in FIG. 2, in some embodiments, the document hierarchy generation system 104 performs an act 210 of generating a digital document hierarchy. For example, the document hierarchy generation system 104 generates a digital document hierarchy by combining the determined child visual elements and visual elements determined at each layer-wise analysis. Thus, for example, the document hierarchy generation system 104 can generate an interconnected graph of parent-child element relationships for visual elements of a digital document image.

Accordingly, in one or more embodiments, the document hierarchy is constructed by iteratively grouping visual elements ("child-boxes") in the current layer into larger regions/elements ("parent boxes") in the next layer. In some embodiments, the child-boxes in the first layer consist of elementary tokens extracted directly from a document page image: textual tokens are extracted by an OCR model and visual regions (e.g., widgets, radio-buttons, and embedded images in the form use case) predicted by a high-precision object detector. For intermediate layers, the document hierarchy generation system 104 hypothesizes a high-recall set of geometrically feasible "potential parent-boxes" directly from the child-boxes, such that each box can group one or more child-boxes and form the next layer in the hierarchy. A multimodal model can predict links between a potential parent-box and all of its child boxes in consecutive layers and jointly predict the semantic label of the parent box. Not all potential parent-boxes are actual elements, so the hierarchy generation system 104 uses constraint inference to keep the parent-boxes that maximize the child-box link probabilities and satisfy hierarchical constraints. This process is repeated one layer at a time, starting from the lowest layer of elementary tokens and recursively grouping the lower-level elements into higher-level constructs to form a hierarchical arrangement of spatial boxes.

To illustrate, the document hierarchy generation system 104 recursively groups child-boxes into parent-boxes such that the parent-boxes of the kth layer become child-boxes of the k+1th layer, iterating until only one parent-box remains. In some implementations, each iteration involves three steps: (i) parent-box candidate generation, (ii) candidate link prediction and type classification, and (iii) constraint inference. The first iteration uses elementary token boxes $t_i$ (OCR text, widgets, icons, etc.) as child-boxes. Step (i) hypothesizes geometrically feasible potential parent-boxes (m candidates with an upper limit of $O(n^4)$ due to all relevant combinations of box coordinates) ensuring a high-recall collection of potential parent-boxes. Step (ii) predicts parent-child links and element types for each candidate parent-box with all the child-boxes as input, returning link probabilities $\alpha_{ji} \forall \leq n$; $j \leq m$. Step (iii) selects the subset of parent boxes that are mutually non-overlapping, cover all child-boxes, and maximize a constraint optimization function. Additional detail regarding these steps is provided in the subsequent figures.

As mentioned above, in one or more implementations, the document hierarchy generation system 104 generates feature embeddings. For example, FIG. 3 illustrates the document hierarchy generation system 104 generating feature embeddings from visual elements of a document image in accordance with one or more embodiments.

Figure 3:
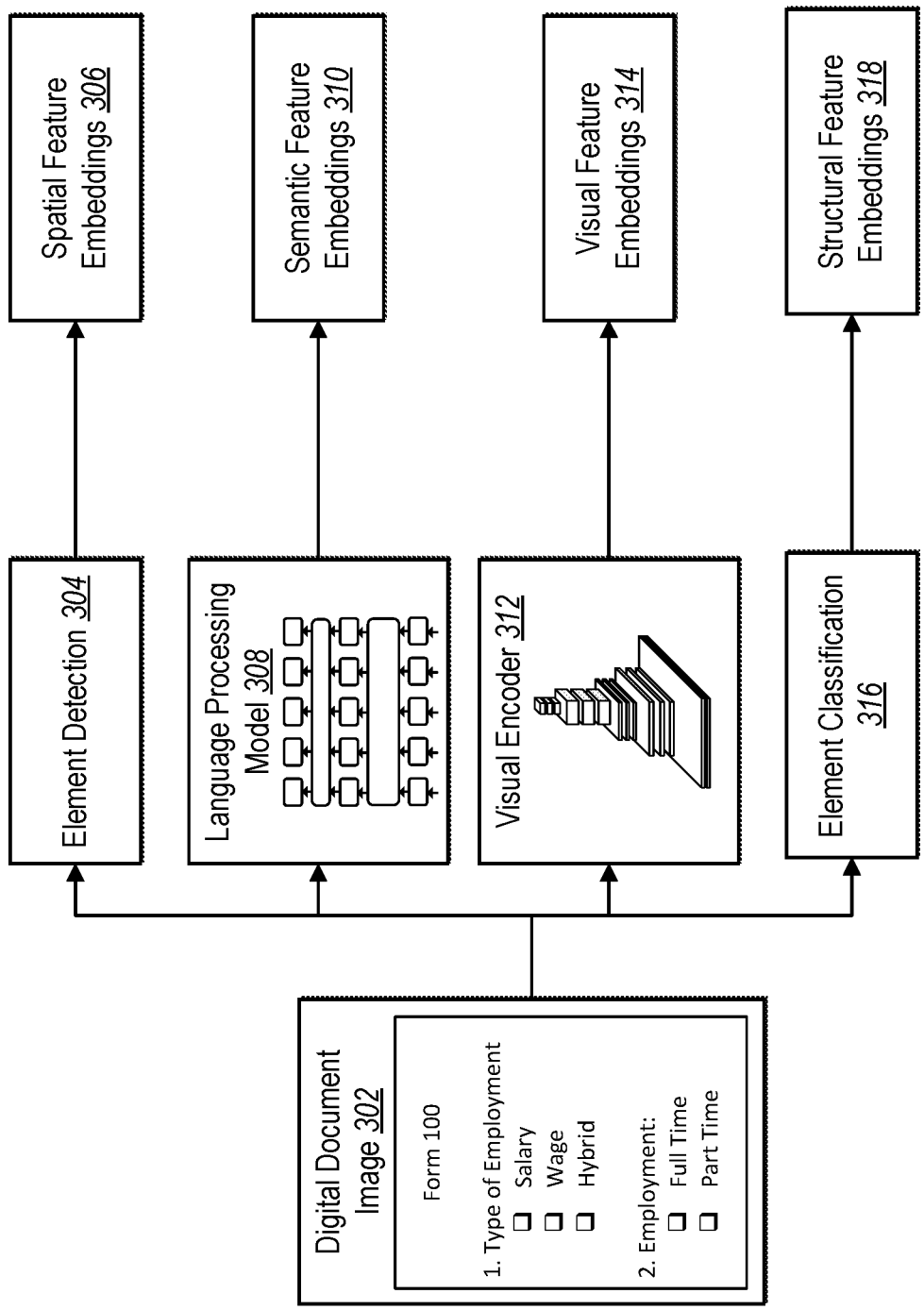
FIG. 3 illustrates a diagram of a document hierarchy generation system generating feature embeddings in accordance with one or more embodiments.

As illustrated in FIG. 3, the document hierarchy generation system 104 receives a digital document image 302. For example, in some embodiments, digital document image 302 is a digitally created document, such as a digital PDF. In some embodiments, digital document image is a scanned image created by scanning a paper document.

As also discussed above, the document hierarchy generation system 104 extracts visual elements from digital document image 302. More specifically, the document hierarchy generation system 104 utilizes a computer-implemented algorithm to perform an act 304 of element detection for visual elements of the digital document image 302. For example, the document hierarchy generation system 104 utilizes optical character recognition (OCR) and a high precision object detector to extract tokens representing visual elements of the digital document image 302 (e.g., OCR tokens, embedded widgets, and icons). For example, the document hierarchy generation system 104 can utilize an object detector train on document to classify mid-level visual elements such as paragraphs, figures, captions.

In some embodiments, the document hierarchy generation system 104 utilizes the elementary tokens to generate an initial document structure for the digital document image 302. Specifically, the document hierarchy generation system 104 utilizes the elementary tokens as initial child elements and representing the initial child elements with bounding boxes (e.g., from the OCR tokens). For instance, the document hierarchy generation system 104 generates initial child elements $b_i$, which are each represented by its bounding box coordinates $(x_1, y_1, x_2, y_2)$, where $(x_1, y_1)$ and $(x_2, y_2)$ are the top-left and bottom-right coordinates, respectively. Additionally, for example, the initial child elements are each assigned a predefined visual element label $t_i$. Moreover, the document hierarchy generation system 104 identifies words within each child element by linearly serializing OCR text tokens that are within the bounding boxes of each initial child element.

The document hierarchy generation system 104 organizes the initial child elements in an n-ary tree format, where a child element in a higher layer may be a parent element of one or more child elements in the layer below. Thus, each initial child element of the initial document structure contains a list of nested child elements represented as bounding boxes such that each child element is grouped into one parent element (e.g., there is no overlap in the parent elements), and each parent element groups together all geometrically possible child elements.

As previously mentioned, document hierarchy generation system 104 generates spatial feature embeddings 306 from positional coordinates. Specifically, the document hierarchy generation system 104 generates spatial feature embeddings from the bounding boxes representing the child elements. In some embodiments, document hierarchy generation system 104 extracts the bounding box coordinates to derive the relative layout information for each child element.

Consider the set of n child boxes (i.e., child visual elements) serialized in a left-to-right and top-to-bottom fashion in the kth layer as $c_i \in \{c_1, c_2 \ldots c_n\}$ and the $j^{th}$ potential parent box candidate under consideration as $p_j$. The document hierarchy generation system 104 can represent each box with three or more input modalities (i) semantic cues, (ii) spatial cues, and (iii) structural cues. The document hierarchy generation system 104 can also represent the visual encoding of the entire document image to augment the spatial and semantic signals with visual cues.

For example, the bounding box of each child element is present through its upper left ($[x_1, y_1]$) and bottom-right ($[x_1, y_1]$) co-ordinates that are normalized $b=[x_1/W, y_1/H, x_2/W, y_2/H]$, where H and W are the height and width of digital document image 302. The document hierarchy generation system 104 generates the spatial feature embedding by concatenating a normalized parent element $b_{(p_j)}$ with a sequence of normalized child elements $(b_{(c_1)}, b_{(c_2)} \ldots b_{(c_n)})$ to form the spatial input sequence $B_n^j = [b_{p_j} \oplus b_{c_1} b_{c_2} \ldots b_{c_n}]$.

Moreover, as previously mentioned, the document hierarchy generation system 104 extracts text from visual elements to generate feature embeddings. Specifically, the document hierarchy generation system 104 utilizes a trained natural language processing model 308 to extract text for each child element (e.g., text within the bounding box coordinates for each child element) to generate semantic feature embeddings 310. In some embodiments, the document hierarchy generation system 104 uses the trained natural language processing model 308 to encode the text (w_i) from the child elements into sentence embedding $s=SBert([[CLS], w_i])$ of dimension $1 \times d_S$ where $d_S$ is the hidden states of the SBert language model (or another language model). Furthermore, the document hierarchy generation system 104 generates semantic feature embeddings 310 by concatenating a potential parent box $s_{(p_j)}$ with the sequence of sentence embeddings of child elements $(s_{(c_1)}, s_{(c_2)} \ldots s_{(c_n)})$ and passing them through a fully connected layer to form the semantic input sequence $S_j^n = \sigma(W_1 ([s_{p_j} \oplus s_{c_1} s_{c_2} \ldots s_{c_n}]) + \delta_1)$, $W_1$, $\delta_1$, and $\sigma(\cdot)$ denote the weight matrices, bias and Sigmoid activation function, respectively. Moreover, $\oplus$ represents concatenation.

Furthermore, as previously mentioned, in some embodiments the document hierarchy generation system 104 generates the visual feature embeddings 314. Specifically, the document hierarchy generation system 104 utilizes a visual encoder 312 to generate a visual feature map from which to generate visual feature embeddings 314. For example, the document hierarchy generation system 104 resizes the digital document image 302 to a fixed size (h, w, 3) which is passed through the visual encoder 312 to obtain a visual feature map $\eta = VE(I_D)$. In some implementations, the document hierarchy generation system 104 utilizes the visual feature map across all layers and parent element configurations in creating the digital document hierarchy.

Moreover, a previously mentioned, in some embodiments the document hierarchy generation system 104 generates structural feature embeddings using generated element classifications. Specifically, the document hierarchy generation system 104 utilizes the initial child elements in an initial layer to generate element classifications 316 and utilizes those element classifications to generate structural feature embeddings 318. In some embodiments, because a parent element is not initially known (e.g., in the first predicted layer), the document hierarchy generation system 104 represents the parent element by a dummy value of <PBOX> in an input sequence. The document hierarchy generation system 104 generates a structural feature embedding by concatenating the element classifications of the parent elements followed by the linearly serialized child element, wherein the structural feature embedding is represented by $T_j^n = [<PBOX>:t_{(c_1)}, t_{(c_2)} \ldots t_{(c_n)}]$.

Figure 4:
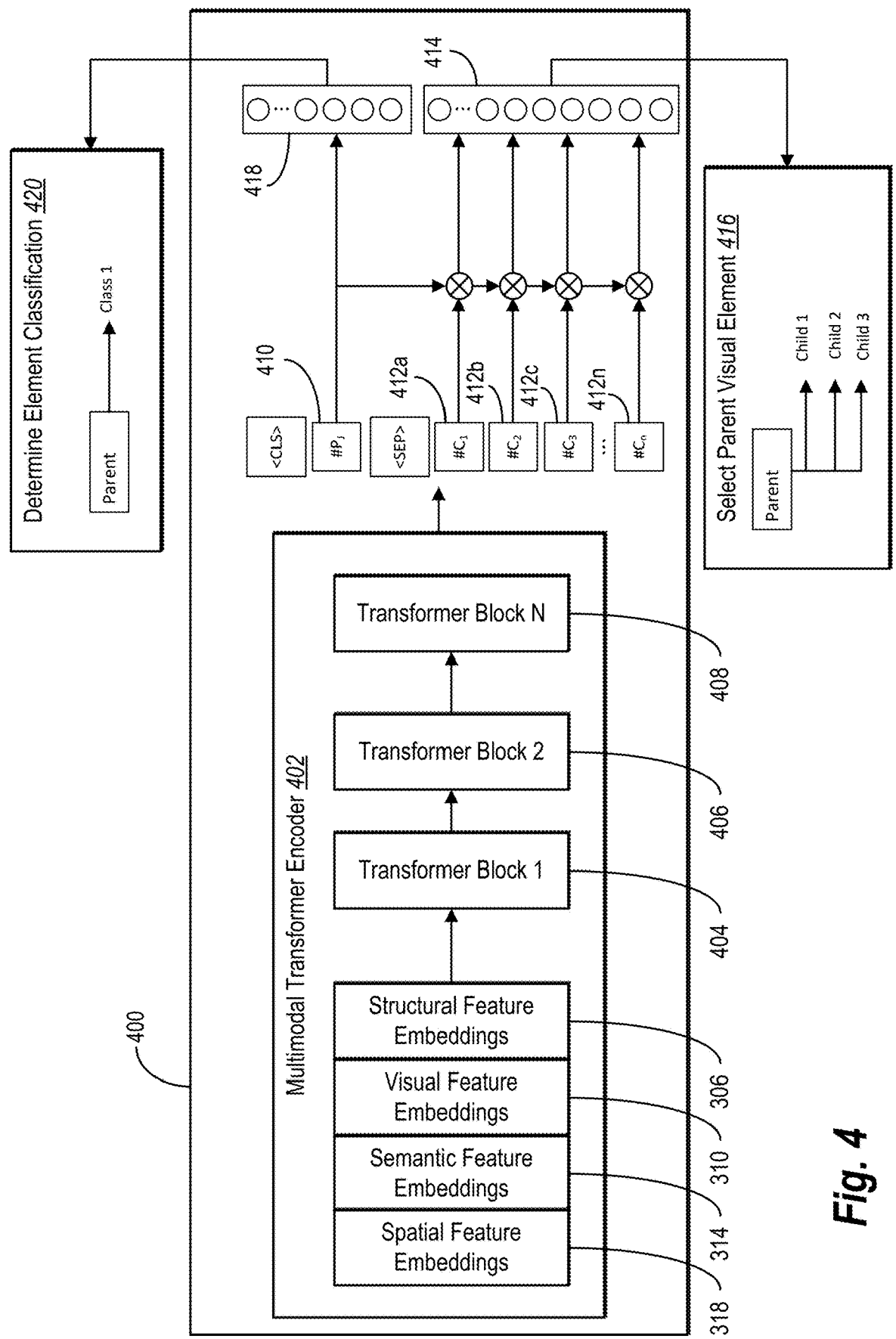
FIG. 4 illustrates a diagram of utilizing a neural network having a multimodal contextual encoder to select parent visual elements and determine element classifications in accordance with one or more embodiments.

As mentioned above, in some implementations, the document hierarchy generation system 104 utilizes a multimodal contextual encoder. For example, FIG. 4 illustrates the document hierarchy generation system 104 utilizing a multimodal contextual encoder to select parent visual elements for child visual elements in accordance with one or more embodiments. Specifically, as discussed above, the document hierarchy generation system 104 identifies child visual elements and candidate parent visual elements. For each candidate parent visual elements, the document hierarchy generation system 104 analyzes the corresponding child visual elements. Specifically, the document hierarchy generation system 104 generates the spatial feature embeddings 306, the semantic feature embeddings, and the structural feature embeddings 318 for the candidate parent visual element and child visual elements. The document hierarchy generation system 104 also generates the visual feature embeddings 314 for the digital document image. The document hierarchy generation system 104 analyzes these feature embeddings to select parent visual elements utilizing a neural network 400.

As illustrated in FIG. 4, the document hierarchy generation system 104 utilizes the spatial feature embeddings 306, the semantic feature embeddings 310, the visual feature embeddings 314, and/or the structural feature embeddings 318 as input for a multimodal transformer encoder 402 (and the neural network 400). More specifically, the multimodal transformer encoder 402 includes transformer blocks 404-408 (although three transformer blocks are illustrated, the multimodal transformed encoder 402 can utilize a different number of transformer blocks). The document hierarchy generation system 104 utilizes the transformer blocks 404-408 to process the spatial feature embeddings 306, the semantic feature embeddings 310, the visual feature embeddings 314 and/or the structural feature embeddings 318 from the candidate parent visual elements and the sequences of child elements to generate vector representations of each visual element. Specifically, the multimodal transformer encoder 402 generates a parent feature vector 410 (corresponding to a candidate parent visual element) and child feature vectors 412a-412n (corresponding to child visual elements).

In one or more embodiments, document hierarchy generation system 104 processes the spatial feature embeddings 306, the visual feature embeddings 314, and the structural feature embeddings 318 utilizing the multimodal transformer encoder 402 (e.g., separate from the semantic feature embeddings 310). For example, the multimodal transformer encoder 402 utilizes the transformer blocks 404-408 to generate initial feature vectors from the spatial feature embeddings 306, the visual feature embeddings 314, and the structural feature embeddings 318 and then combines the initial feature vectors with the semantic feature embeddings 310 through late fusion to generate the parent feature vector 410 and the child feature vectors 412a-412n.

In one or more implementations, the document hierarchy generation system 104 combines/compares a candidate parent feature vector with child feature vectors to generate parent-child element link predictions. For example, the document hierarchy generation system 104 can perform a dot product (or other operation) to combine a candidate parent feature vector with a child feature vector and generate a combined parent-child vector representation. Indeed, the document hierarchy generation system 104 can generate a combined parent-child vector representation for the candidate parent visual element and each child visual element.

The document hierarchy generation system 104 can generate a parent-child link probability from the combined parent-child vector representation. For instance, as shown in FIG. 4, the document hierarchy generation system 104 utilize a first convolutional layer 414 to analyze combined parent-child vector representations and generate a parent-child link probability. As illustrated, the document hierarchy generation system 104 then performs an act 416 of selecting parent visual elements. In particular, the document hierarchy generation system 104 utilizes the parent-child link probability to select parent visual elements (e.g., select parent visual elements from candidate parent visual elements). Additional detail regarding selecting a parent visual element is provided below (e.g., in relation to FIG. 5).

Moreover, as shown in FIG. 4, the document hierarchy generation system 104 also utilizes the parent feature vector 410 to perform an act 420 of determining an element classification. For example, the document hierarchy generation system 104 utilizes a second convolutional layer 418 to determine element class probabilities. The document hierarchy generation system 104 then determines an element classification based on the element class probabilities.

Although FIG. 4 illustrates the multimodal transformer encoder 402, the document hierarchy generation system 104 can utilize a variety of encoders and encoder architectures. For example, in some implementations, the document hierarchy generation system 104 utilizes a convolutional neural network as a multimodal encoder (e.g., in place of the multimodal transformer encoder 402). Similarly, in some implementations, can utilize a recurrent neural network (such as a long short term memory network or LSTM) as a multimodal encoder.

Similarly, although FIG. 4 illustrates utilizing the first convolutional layer 414 and the second convolutional layer 418, the document hierarchy generation system 104 can utilize alternative layer architectures. For example, in some implementations, the document hierarchy generation system 104 utilizes transformer layers or fully connected layers in place of the convolutional layers 418, 420.

For example, consider a multimodal contextual encoder, A. The document hierarchy generation system 104 utilizes the multimodal contextual encoder A to combine the structural, spatial, and visual cues extracted from the input candidate parent box (i.e., the candidate parent visual element) and the sequence of child-boxes (i.e., the child visual elements). The semantic cues are concatenated with the embedding of each input box using late fusion which is denoted by $\oplus$. The final box embedding sequence is given by $X_j'' = A([B_j''; T_j''; \eta] \oplus S_j'')$. The box embedding sequence $X_j''$ undergoes a dot product operation with the parent box embedding $X_j''[:p_j]$ to obtain the dot-product embedding vector $[\hat{p}_i \oplus \hat{c}_1, \hat{c}_2, \ldots \hat{c}_n] = X_j''[:p_j] \cdot X_j''$.

Moreover, the dot-product embeddings (i.e., the combined parent-child vector representations) of the child boxes are passed through a dense fully-connected layer and then through a Sigmoid layer to generate link probabilities ($\alpha_{ji} \forall \leq n; j \leq m$) between each child box $\hat{c}_1$ and a potential parent box $p_j$: $\alpha_{j1}, \ldots \alpha_{jn} = \sigma(W_2[\hat{c}_1, \ldots \hat{c}_{1n}] + \delta_2)$, where $W_2$, $\delta_2$ and $\sigma(\cdot)$ are the weight matrices, bias and Sigmoid activation function, respectively. In addition, the parent vector representations are passed through a dense fully-connected layer and then a softmax layer to predict the element classifications. For example, the element classifications can be generated as $\varphi_j = \sigma(W_3(\hat{p}_j) + \delta_3)$.

As mentioned above, in one or more embodiments, the document hierarchy generation system 104 selects parent visual elements from candidate visual elements based on parent-child link probabilities utilizing an optimization model. For example, FIG. 5 illustrates the document hierarchy generation system 104 utilizing an optimization model to select parent visual elements in accordance with one or more embodiments.

As shown, the document hierarchy generation system 104 identifies parent-child link probabilities 504 (e.g., as just described with regard to FIG. 4). For example, the document hierarchy generation system 104 utilizes the neural network 404 to generate parent feature vectors and child feature vectors and then compare these feature vectors to generate parent-child link probabilities.

Figure 5:
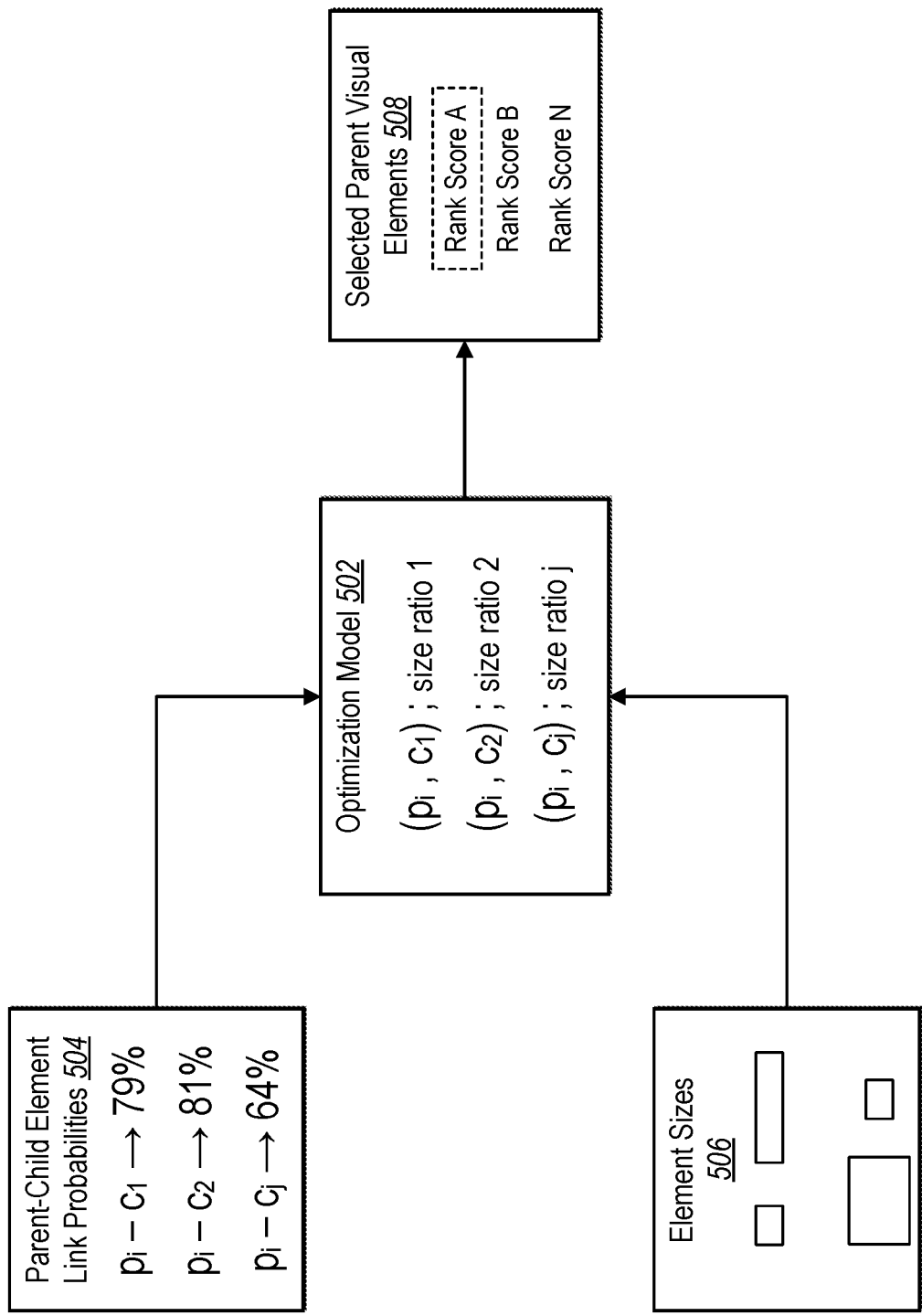
FIG. 5 illustrates a diagram of utilizing an optimization model to select parent visual elements in accordance with one or more embodiments.

In addition, as illustrated in FIG. 5, the document hierarchy generation system 104 identifies element sizes 506. The element sizes 506 can include an area, region, or size corresponding to the visual elements. Thus, for instance, the element sizes 506 can include an area of candidate parent visual elements and child visual elements. The element sizes 506 can be represented in a variety of forms, including a number of pixels, coordinate values, or screen size.

As illustrated, the document hierarchy generation system 104 utilizes an optimization model 502 to generate selected parent visual elements 508 from the parent-child element link probabilities 504 and the element sizes 506. For instance, in some implementations, the document hierarchy generation system 104 determines a score (e.g., a cost or reward) based on the parent-child link probabilities 504. The document hierarchy generation system 104 then seeks to select parent visual elements from a set of candidate parent visual elements based on the score (e.g., to maximize or optimize the overall cost).

The document hierarchy generation system 104 can also determine a cost/reward based on the element sizes 506. For example, the document hierarchy generation system 104 can compare an element size for a candidate parent element with one or more element sizes for one or more child elements (e.g., a size ratio between a candidate parent element and a child element). The document hierarchy generation system 104 can then determine a cost/reward based on the comparison. For example, if the element size of a candidate parent element is roughly the same as a child element, the document hierarchy generation system 104 can apply a penalty to matching the candidate parent element and the child element. Similarly, if the element size of a candidate parent element is significantly larger than a child element, the document hierarchy generation system 104 can apply a penalty to matching the parent element and the child element. Moreover, if a parent element is slightly larger than a child element the document hierarchy generation system 104 can apply a reward (or reduce a cost) for matching the parent element and the child element.

In one or more implementations, the document hierarchy generation system 104 utilizes a constrained optimization approach that applies one or more constraints to the optimization. For example, the document hierarchy generation system 104 can require that each child visual element only belong to one (and only one) parent visual element. The document hierarchy generation system 104 can apply other constraints, such as requiring child elements to fall within the boundaries of a parent visual element.

The document hierarchy generation system 104 can utilize a variety of optimization models. For example, an optimization includes computer-implemented model that seeks to improve or optimize an objective or reward (e.g., by selecting a subset of parent visual elements). For example, the document hierarchy generation system 104 can utilize a greedy optimization model. To illustrate, the document hierarchy generation system 104 can determine a score based on the parent-child link probabilities 504 and the element sizes 506. The document hierarchy generation system 104 can utilize a greedy optimization algorithm by selecting the parent visual element based on the score (e.g., the highest score/reward) and assign child elements to the parent visual element (e.g., child elements that fall within the parent visual element). The document hierarchy generation system 104 can then remove the assigned parent/child visual elements, remove any invalid parent boxes (e.g., that parent boxes that already included assigned children boxes), and analyze the parent visual element with the next best score.

To illustrate, consider a parent box. The document hierarchy generation system 104 can identify the child boxes that fall within the parent box. The document hierarchy generation system 104 can add all of the parent-child link probabilities between the parent and the child boxes that fall within the parent box to get a parent score. If the score for the parent box is the highest, the document hierarchy generation system 104 selects the parent box and invalidates other conflicting parent boxes. For instance, any other parent box that would have included the child boxes of the parent box are then invalidated. The document hierarchy generation system 104 then selects the next remaining parent box with the next highest score and repeats the process.

In addition to a greedy optimization algorithm, the document hierarchy generation system 104 can also utilize a global optimization algorithm. For example, the document hierarchy generation system 104 can utilize integer linear programming (or another optimization algorithm) to select a set of parent visual elements for a given layer that will maximize/optimize the score (e.g., reward or cost).

Thus, for the kth layer, the document hierarchy generation system 104 predicts link probabilities $\alpha_{ij}$ between each pair of potential parent box $p_i$ and child box $c_j$. The document hierarchy generation system 104 selects a set of parent boxes by solving a constraint optimization problem, maximizing the objective function $\hat{Y} = \max_{y_i \in Y} \Sigma_i^m \omega_i y_i$, where $$\omega_i = \kappa + \frac{\Sigma_j \hat{\alpha}_{ij}}{Ar(p_i)^k / AR\left(\bigcup_{j=0}^n c_j\right)},$$

$\hat{\alpha}_{ij}$ is the adjusted link probability between $p_i$ and $c_j$ such that $\hat{\alpha}_{ij} = \alpha_{ij} - 1$. K is a large constant added to make all parent scores positive to avoid trivial solution of all weights as zero. $Ar(\cdot)$ defines area of a box and $\bigcup_{j=0}^n c_j$ is the union of all n child boxes. $y_i \to 1$ represents the case where the potential parent box $p_i$ is accepted as a valid parent box.

The optimization is subject to constraint space $Y = Y_1 \cap Y_2$ defined over the set of all pairs of potential parent boxes $\mathfrak{R}^m$, where $Y_1 : y_i \in \{0,1\}$ and $Y_2 : y_a + y_b \leq 1 \forall a, b \in \mathfrak{R} \times \mathfrak{R}$, $Ar(p_a \cap p_b) > 0$. This can be solved as a Maximum Independent Set Problem when reduced to a linear-programming relaxation by constraining $y_i$ to be binary. It can be solved using Integer Linear Programming (ILP). However, the number of parent boxes can easily grow exponentially.

Accordingly, in some circumstances the document hierarchy generation system 104 can us to further relax the ILP solution by greedily selecting one parent with highest $\omega_i$ at a time.

In some implementations, for each potential parent box the document hierarchy generation system 104 selects geometrically possible children that lie within its bounding box. For such child, the document hierarchy generation system 104 adds the link prediction scores between the parent under consideration and the geometrically possible child boxes. This can be referred to as the edge affinity score. Moreover, the document hierarchy generation system 104 determines an area penalty utilizing the following:

Area penalty=(area of document/sum of area of children)^level of hierarchy

Moreover, the document hierarchy generation system 104 determine a parent rank score according to the following:

PRS=(((edge_affinity−(0.5*no_of_children))*area_penalty)−0.5*no_of_children)

Accordingly, the document hierarchy generation system 104 sorts the potential parent box candidates in the decreasing order of their parent rank score and chooses the ones with high scores. Each time the document hierarchy generation system 104 selects a potential parent box, the document hierarchy generation system 104 reserves of its constituent children. In this way, another potential parent having any child box common with the ones already reserved cannot be chosen. The document hierarchy generation system 104 continues selecting parent boxes until all the child boxes are not reserved. The selected parents form the next layer of the hierarchy, and they are used as child boxes in the next round of hierarchy generation until only one child box remains. In case the number of parent boxes selected does not decrease at any given stage, the document hierarchy generation system 104 can skip those parents and rerun the loop with increased penalty.

Figure 6:
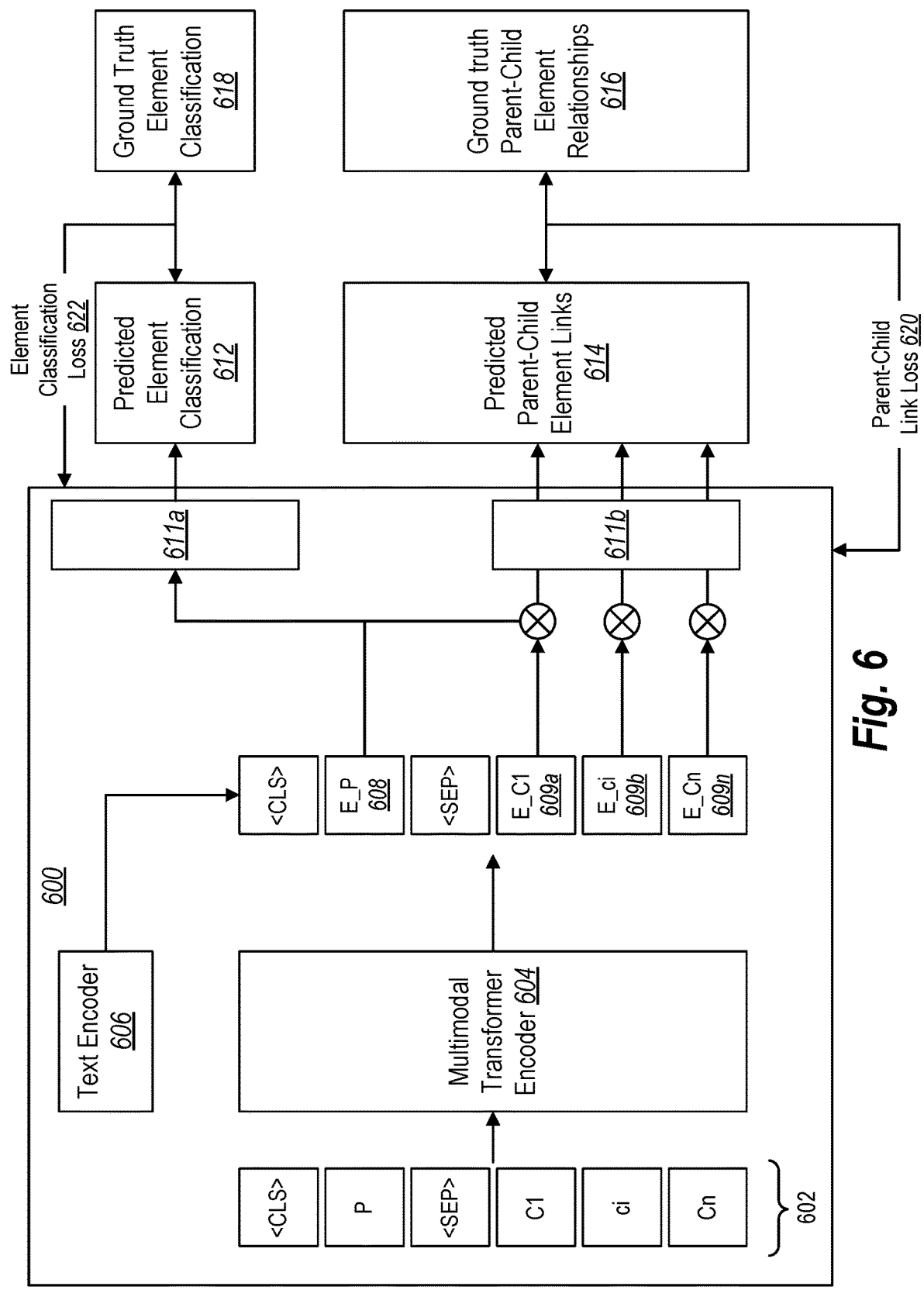
FIG. 6 illustrates training a neural network to generate element classifications in accordance with one or more embodiments.

As mentioned above, the document hierarchy generation system 104 can train a neural network. For example, FIG. 6, illustrates training a neural network 600 to determine parent-child element links and/or element classifications for digital document images in accordance with one or more embodiments. In particular, FIG. 6 illustrates utilizing a parent-child element training dataset to train the neural network 600 to generate element classifications and parent-child element links for digital document images.

In relation to FIG. 6, the document hierarchy generation system 104 utilizes a training data set. For example, in some embodiments, the training dataset includes digital document images having layers with ground truth parent-child element relationships. The ground truth parent-child element relationships can include both positive samples and negative samples. To illustrate, the training dataset can include digital document images with positive examples (e.g., layers having identified child visual elements and parent visual elements). In some instances, the training dataset can include digital document images with negative examples (e.g., visual elements that are identified as false parent elements). The training data set can also include ground truth element classifications for visual elements portrayed in the digital document images.

For example, the document hierarchy generation system 104 can utilize a training dataset that comprises a ground truth document hierarchy composed of elements arranged in a tree-like format where a higher element (e.g., a list or field) may be a parent of one or more basic elements (e.g., OCR extracted text). The document hierarchy can include a variety of element classifications, such as Widget, TableRow, ChoiceGroup, Footer, Section, ListItem, Table, TextRun, TableCell, TextBlock, List, Image, Field, Form, or Header.

The document hierarchy generation system 104 can generate feature embeddings 602 from the digital document images of the training dataset. As discussed above, the document hierarchy generation system 104 can extract potential visual elements (e.g., boxes) and determine candidate parent elements (with corresponding child visual elements). Moreover, as discussed above, the document hierarchy generation system 104 can generate spatial feature embeddings, semantic feature embeddings, visual feature embeddings, and/or structural feature embeddings from the digital document image. As shown, the document hierarchy generation system 104 generates the feature embeddings 602 for candidate parent visual elements and corresponding child visual elements.

In addition, the document hierarchy generation system 104 process the feature embeddings utilizing a multimodal transformer encoder 604 (e.g., the multimodal transformer encoder 402). As mentioned above, in some implementations, the document hierarchy generation system 104 utilizes a text encoder 606 (e.g., SBert) to generate semantic feature embeddings and combines the semantic feature embeddings at a later stage (e.g., after processing other feature embeddings utilizing the multimodal transformer encoder 604).

As shown, the document hierarchy generation system 104 generates a parent feature vector 608 and child feature vectors 609a-609n from the feature embeddings using the multimodal transformer encoder 604. Moreover, using a first convolutional layer 611a, the document hierarchy generation system 104 analyzes the parent feature vector 608 to generate a predicted element classification 612 (e.g., a parent element classification). For example, the document hierarchy generation system 104 can classify each parent into one of the following classes (or other classes): Widget, TableRow, ChoiceGroup, Footer, Section, ListItem, Table, TextRun, TableCell, TextBlock, List, Image, Field, Form, or Header.

In addition, as described above, the document hierarchy generation system 104 combines/compares the parent feature vector 608 and the child feature vectors 609a-609n to generate combined parent-child vector representations. The document hierarchy generation system 104 utilizes a second convolutional layer 611b to process the combined parent-child vector representations and generate predicted parent-child element links 614 (e.g., parent-child element link probabilities).

As shown in FIG. 6, the document hierarchy generation system 104 can utilize the predicted element classification 612 and/or the predicted parent-child element links 614 to train the neural network 600. For example, as shown, the document hierarchy generation system 104 can compare a ground truth parent-child element relationship 616 with the predicted parent-child element link 614. Specifically, in some implementations, the document hierarchy generation system 104 utilizes a loss function (e.g., cross entropy loss) to compare the ground truth parent-child element relationship 616 with the predicted parent-child element link 614 to determine a parent-child link loss 620. The document hierarchy generation system 104 then modifies parameters of the neural network 600 (e.g., parameters of the multimodal transformer encoder 604 and parameters of the second convolutional layer 611b) based on the parent-child link loss 620. For instance, the document hierarchy generation system 104 can utilize gradient descent and back-propagation to modify parameters of the neural network 600 to reduce the parent-child link loss 620.

The document hierarchy generation system 104 can utilize a variety of loss functions to determine the measure of loss. For example, the loss function can include a regression loss function (e.g., a mean square error function, a quadratic loss function, an L2 loss function, a mean absolute error/L1 loss function, mean bias error). Additionally, or alternatively, the loss function includes a classification-type loss function (e.g., a hinge loss/multi-class SVM loss function, cross entropy loss/negative log likelihood function).

In addition, as shown, the document hierarchy generation system 104 can compare the predicted element classification 612 with a ground truth element classification 618. In particular, the document hierarchy generation system 104 can utilize a loss function to determine an element classification loss 622 between the predicted element classification and the ground truth element classification. The document hierarchy generation system 104 can modify parameters of the neural network 600 (e.g., parameters of the multimodal transformer encoder 604 and parameters of the first convolutional layer 611a) based on the element classification loss 622. Thus, in some implementations, the document hierarchy generation system 104 jointly trains the neural network 600 (and the multimodal transformer encoder 604) based on the element classification loss 622 and the parent-child link loss 620. In some implementations the document hierarchy generation system 104 trains the neural network 600 end to end using (i) Categorical Cross Entropy loss with Adam optimizer for element classification, and (ii) Weighted Binary Cross Entropy with Adam for link prediction.

The document hierarchy generation system 104 can train the neural network 600 in a layer-wise fashion by generating predicted element classifications and/or predicted parent-child link predictions for various layers of a digital document image. In some implementations, the document hierarchy generation system 104 generates predictions at a first layer (and modifies parameters of the neural network 600). The document hierarchy generation system 104 also takes a first layer as known (e.g., takes the ground truth first layer) and then generates predictions at a second layer (and modifies parameters of the neural network 600. In one or more embodiments, the document hierarchy generation system 104 first generates predictions at all the layers and the compares the predictions with the ground truths (e.g., compares a final prediction for the whole document with the ground truths for the whole document).

In some implementations, the document hierarchy generation system 104 also utilizes an optimization model to generate the predicted parent-child element links. For example, the document hierarchy generation system 104 applies the optimization model 502 to select parent visual elements from candidate visual elements. The document hierarchy generation system 104 then compares the selected parent visual elements (and corresponding child elements) with the ground truth parent-child element relationships. In this manner, the document hierarchy generation system 104 can also take into account the impact of an optimization model in learning network parameters.

In some implementations, the document hierarchy generation system 104 also utilizes a layer indicator to generate predictions. For example, the document hierarchy generation system 104 can generate a layer number embedding/input. The document hierarchy generation system 104 can utilize the neural network 600 to process the layer number with the other feature embeddings to generate predicted element classes and/or parent-child element relationships. Thus, the neural network 600 can learn interactions between element classifications or parent-child element relationships relative to particular document layers.

Accordingly given one potential parent box $p_i$ in n+1th layer and child boxes $\{c_1, c_2, c_3, \ldots c_j\}$ of the nth layer, the document hierarchy generation system 104 trains a classifier that predicts the parent-child link between all pairs of $(p_i, c_1), (p_i, c_2), \ldots (p_i, c_j)$ simultaneously. The document hierarchy generation system 104 can train a single model that is capable of generating predictions for all layers and all sets of parent-children using the same architecture and configurations.

Moreover, because potential parent-boxes will often be false positives, to deal with the sparsity of positive samples at test time, the document hierarchy generation system 104 introduces negative sampling in the training regime. For each training sample having at least one positive link between the potential parent-box and any of the input child-boxes, the document hierarchy generation system 104 adds an unrelated parent-box example to the training set for the same setting of child-boxes to make the training robust to negative samples and outliers.

In some implementations, the document hierarchy generation system 104 concatenates the encoded representations of the potential parent box along with all child boxes of the layer in an input sequence. Input_seq=<start><parent><sep><c1><c2> ... <cj><end>. The document hierarchy generation system 104 forms similar corresponding sequences to represent the bounding boxes, type of box, and text sequence contained within the boxes. Thus, the document hierarchy generation system 104 can utilizes multiple (e.g., 3) types of input sequences, representing the same order of boxes but different modalities.

Moreover, in some implementations, for element type classification the document hierarchy generation system 104 uses a weighted cross-entropy loss to adjust for class imbalance, while link prediction uses a negative sample cross-entropy loss to account for negative data augmentation. Both tasks are correlated and reinforce each other, so the document hierarchy generation system 104 use multi-task training to optimize both tasks simultaneously. The final optimization uses a weighted sum of the link prediction loss and element classification loss $\mathcal{L} = \lambda \mathcal{L}_{Link} + (1-\lambda) \mathcal{L}_{Class}$, where the weighting factor $\lambda$ is a hyperparameter.

For example, the document hierarchy generation system 104 can perform a negative sampling process by generating a false parent visual element that differs from the true parent visual elements to include in a training dataset. For example, the document hierarchy generation system 104 generates a false parent visual element with a random element size (e.g., x1, x2, y1, y2) that has no overlap with any of the true parent visual elements. In some embodiments, each layer in the training dataset has a proportional number of true parent visual elements and false parent visual elements, such that there is one false parent visual element for each true parent visual element.

As mentioned above, the document hierarchy generation system 104 can generate a digital document hierarchy. For instance, the document hierarchy generation system 104 generates a digital document hierarchy by iteratively selecting parent elements in a layer-wise fashion. Specifically, the document hierarchy generation system 104 selects parent elements from child visual elements in each layer, continuously repeating the process until a digital document hierarchy is generated. For example, FIGS. 7A-7E illustrate the document hierarchy generation system 104 generating digital document hierarchies from visual elements of digital document images in accordance with one or more embodiments.

Figure 7A:
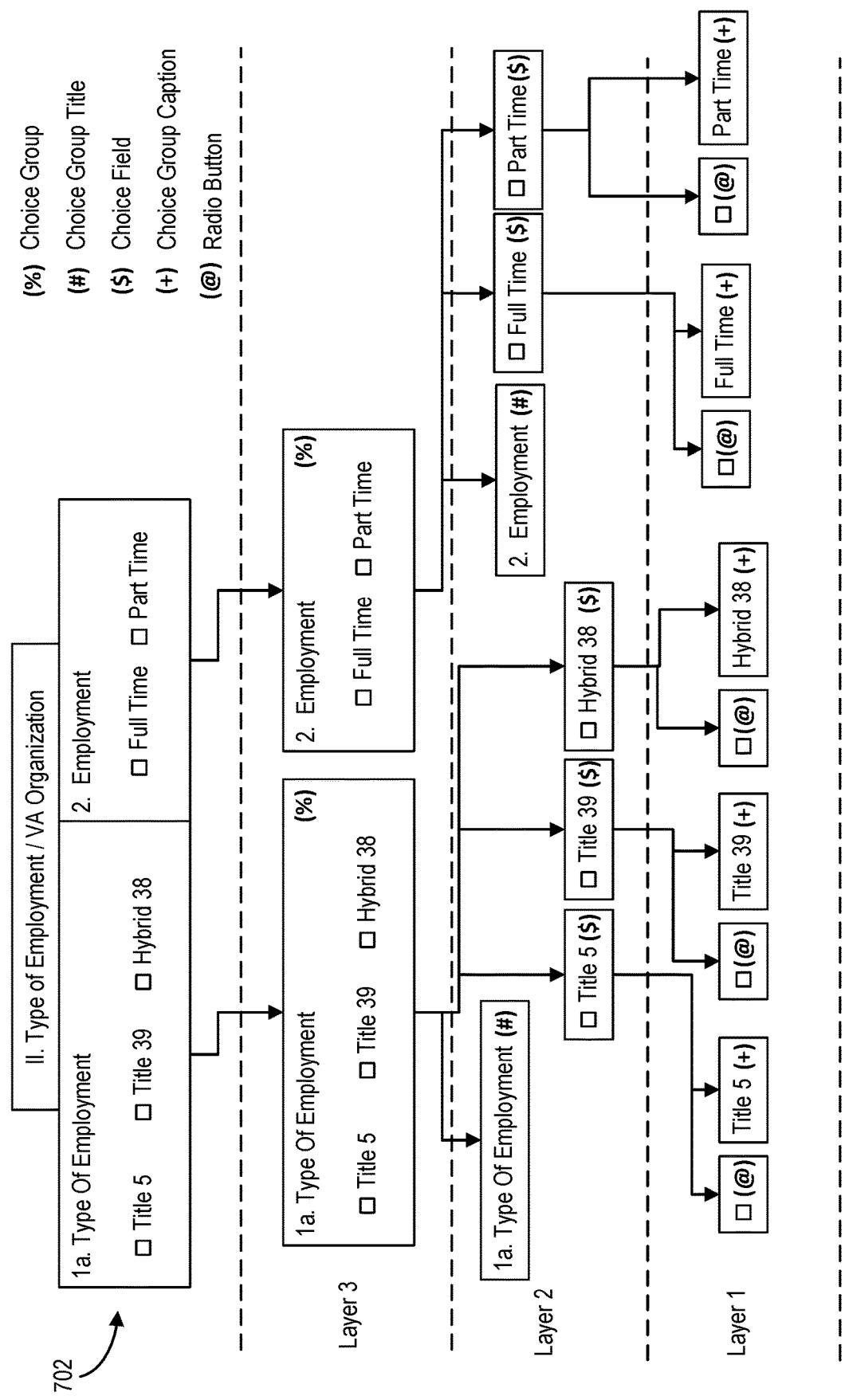

As shown in FIG. 7A, the document hierarchy generation system 104 system analyzes an input digital document image 702. As previously described, in some embodiments, the digital document image 702 is an image from which the document hierarchy generation system 104 can extract visual elements, such as a digital PDF or a scanned image PDF. In relation to FIG. 7A, the digital document image 702 includes an employment form with multiple choice fields.

The document hierarchy generation system 104 provides the digital document image 702 to a neural network (e.g., the neural network 400 or the neural network 600). Moreover, as described above, the neural network iteratively analyzes various layers of the digital document image to determine a digital document hierarchy. As shown in FIG. 7A, the document hierarchy generation system 104 determines a first layer, a second layer, and a third layer with parent-child relationships between the layers. Moreover, for each element within each layer, the document hierarchy generation system 104 determines a classification for the visual element.

For example, with regard to the first layer, the document hierarchy generation system 104 identifies child visual elements classified as radio buttons and choice group captions. Moreover, the document hierarchy generation system 104 determines that these child visual elements relate to parent visual elements (i.e., elements classified as choice fields and choice group titles). Similarly, at the second layer, the document hierarchy generation system 104 determines parent-child relationships for the parent elements of the first layer. For example, the document hierarchy generation system 104 determines that the choice field and the choice group title elements of the second layer relate to two different parent visual elements (i.e., two different choice groups).

In addition, the document hierarchy generation system 104 can utilize the digital hierarchy to determine more accurate word order. For example, the document hierarchy generation system 104 can traverse the nodes of the digital hierarchy and assign a reading order based on the digital hierarchy. Thus, for example the document hierarchy generation system 104 can travers within a family of the hierarchy before moving onto another family within the hierarchy. In one or more embodiments, the document hierarchy generation system 104 traverses the digital hierarchy from top-to-bottom and left-to-right to determine a reading order from the text related elements (e.g., first the "II. TYPE OF EMPLOYMENT/VA ORGANIZATION" text, then "1a. TYPE OF EMPLOYMENT," then "TITLE 5," then "TITLE 38," then HYBRID 38, then "2. EMPLOYMENT," then "PART TIME," then "FULL TIME." Notably, using this approach, the document hierarchy generation system 104 identifies text that logically corresponds to the same groupings and is more accurately relative to a reading order. In contrast, many conventional systems would inaccurately infer text order based on adjacency, even if the text belongs to different elements/groupings.

Similarly, FIGS. 7B-7E illustrate different layers of a digital document image identified by the document hierarchy generation system 104. For example, FIG. 7B illustrates child elements and parent elements of a first layer of the digital document image. FIG. 7C illustrates child elements and parent elements of a second layer of the digital document image (notably, the child elements of FIG. 7C come from the parent elements of FIG. 7B). In addition, FIG. 7D illustrates child elements and parent elements of a third layer of the digital document image and FIG. 7E illustrates child elements and parent elements of a fourth layer of the digital document image.

As mentioned above, the document hierarchy generation system 104 can also utilize digital document hierarchies. For example, the document hierarchy generation system 104 can generate an interactive digital document from a digital document image. Indeed, up on identifying visual elements and determining parent-child relationships, the document hierarchy generation system 104 can provide interactive functionality. For instance, upon determining that a selection element includes a plurality of check boxes and corresponding text elements, the document hierarchy generation system 104 can allow a client device to interact with the check boxes and determine the interactive relationship between the various check boxes (e.g., remove selection from one check box upon selection of another check box). Thus, in form field authoring (e.g., generating a form document for obtaining signatures from signing parties), the document hierarchy generation system 104 can determine field groups (e.g., widgets and field labels) or checkbox groups. Similarly, the document hierarchy generation system 104 can allow client devices to move or reorganize a digital document image using parent-child relationships (e.g., move list items and their corresponding bullets together).

Moreover, the document hierarchy generation system 104 can generate interactive digital documents that flexibly adapt across different screens, devices, or user interfaces. Indeed, upon determining parent-child relationships, the document hierarchy generation system 104 can adjust a document layout and provide grouped visual elements in varying locations or arrangements for different devices or user interfaces. Thus, for example, the document hierarchy generation system 104 can reflow visual elements in an interactive digital document as a user modifies a screen size for the digital document or upon using a different device with a different screen size (e.g., a mobile device instead of a laptop or desktop computer) to view the digital document.

In addition, the document hierarchy generation system 104 can utilize the digital document hierarchy to determine a text order for the digital document image. Indeed, conventional OCR approaches often generate inaccurate text order because they fail to account for visual element relationships in determining text order. Thus, for instance, adjacent text boxes often lead conventional systems to determine a text order that blends the text from the two adjacent text boxes. The document hierarchy generation system 104 can utilize a document hierarchy to more correctly infer text order. Thus, for example, the document hierarchy generation system 104 can generate a text order that groups text from a first visual element (with a first set of parent-child elements) and then groups text from a second visual element (with a second set of parent-child elements) after the text from the first visual element.

By inferring text order based on these parent-child relationships, the document hierarchy generation system 104 can determine more accurate text orders. Thus, for example, the document hierarchy generation system 104 can utilize determined text orders as input to natural language processing models to more accurately infer the meaning or purpose of a particular digital document. Moreover, the document hierarchy generation system 104 can also utilize a determined text order to train language machine learning models.

Example embodiments of the document hierarchy generation system 104 significantly outperform multiple baselines on multiple tasks (element type classification, group identification, hierarchy reconstruction, and reading order inference) and multiple datasets (FUNSD for filled forms, Flamingo for blank forms, and RICO for graphical user interfaces). Baselines include a number of state-of-the-art NLP, vision, and multimodal techniques, and example implementations of the document hierarchy generation system 104 outperform on all these tasks, in many cases by a large margin.

Figure 8:
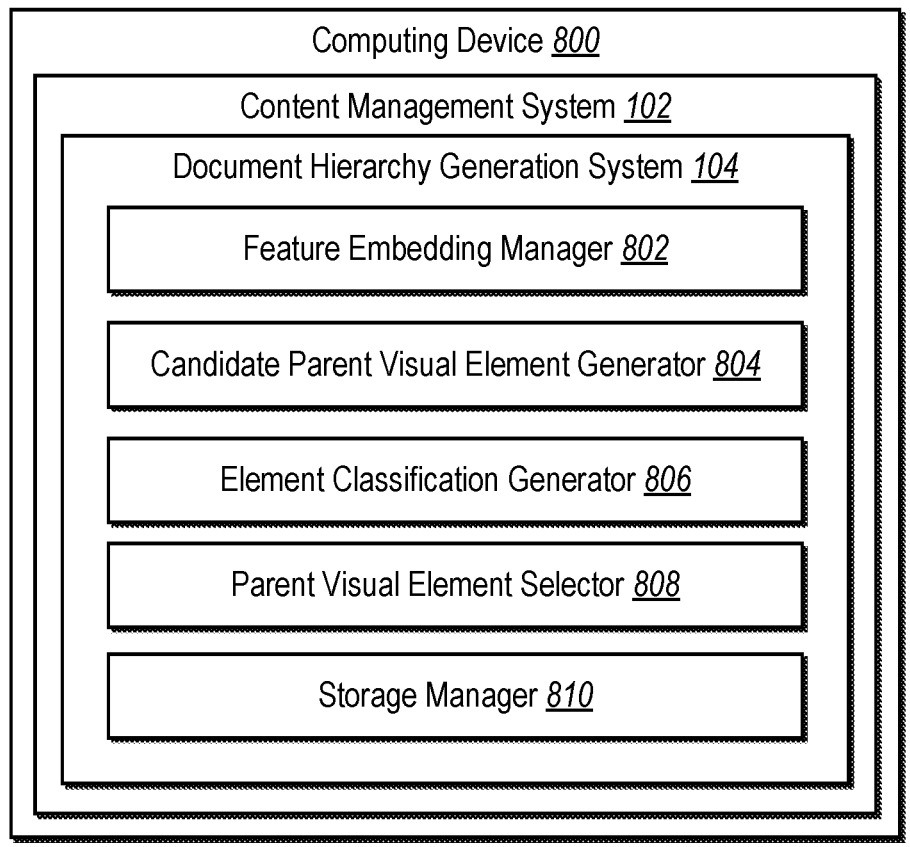
FIG. 8 illustrates a schematic diagram of an example architecture of a document hierarchy system in accordance with one or more embodiments.

Turning to FIG. 8, additional detail will now be provided regarding various component and capabilities of the document hierarchy generation system 104. In particular, FIG. 8 shows the document hierarchy generation system 104 implemented by the computing device 800 (e.g., the server(s) 101 and/or the client device 106 discussed above with reference to FIG. 1). Additionally, the document hierarchy generation system 104 is also part of the content management system 102. As shown in one or more embodiments, the document hierarchy generation system 104 includes, but is not limited to, a feature embedding manager 802, a candidate parent visual element generator 804, an element classification generator 806, a parent visual element selector 808, and a storage manager 810.

As just mentioned, and as illustrated in FIG. 8, the document hierarchy generation system 104 includes the feature embedding manager 802. In one or more embodiments, the feature embedding manager extracts visual elements from digital document images and generates feature embeddings. For example, feature embeddings generator performs the acts described in reference to FIG. 2 and FIG. 3 to identify visual elements and generate child elements.

As additionally shown in FIG. 8, the document hierarchy generation system 104 includes the candidate parent visual element generator 804. As described above, in one or more embodiments, the candidate parent visual element generator 804 utilizes one or more heuristics or constraints to identify candidate parent visual elements from a set of input visual elements extracted from a digital document image.

As further shown in FIG. 8, the document hierarchy generation system 104 includes the element classification generator 806. In one or more embodiments, the element classification generator 806 utilizes the multimodal transformer encoder to generate element classifications for candidate parent visual elements.

As also shown in FIG. 8, the document hierarchy generation system 104 includes the parent visual element selector 808. In one or more embodiments, the parent visual element selector 808 generates parent-child element link probabilities for the candidate parent visual elements and the child visual elements. Moreover, the parent visual element selector 808 selects parent visual elements from the candidate parent visual elements based on the parent-child element link probabilities.

Furthermore, as shown in FIG. 8, the document hierarchy generation system 104 includes storage manager 810. In some embodiments, storage manager 810 is used to store a digital document image, a neural network, a multimodal transformer encoder, and/or a digital document hierarchy.

Each of the components 802-810 of the document hierarchy generation system 104 can include software, hardware, or both. For example, the components 802-810 can include one or more instructions stored on a computer-readable storage medium and executable by processors of one or more computing devices, such as a client device or server device. When executed by the one or more processors, the computer-executable instructions of the document hierarchy generation system 104 can cause the computing device(s) to perform the methods described herein. Alternatively, the components 802-810 can include hardware, such as a special-purpose processing device to perform a certain function or group of functions. Alternatively, the components 802-810 of the document hierarchy generation system 104 can include a combination of computer-executable instructions and hardware.

Furthermore, the components 802-810 of the document hierarchy generation system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-810 may be implemented as a stand-alone application, such as a desktop or mobile application. Furthermore, the components 802-810 may be implemented as one or more web-based applications hosted on a remote server. The components 802-810 may also be implemented in a suite of mobile device applications or "apps." To illustrate, the components 802-810 may be implemented in an application, including but not limited to ADOBE DOCUMENT CLOUD, ADOBE ACROBAT, or ADOBE SIGN. The foregoing are either registered trademarks or trademarks of Adobe Systems Incorporated in the United States and/or other countries.

Figure 9:
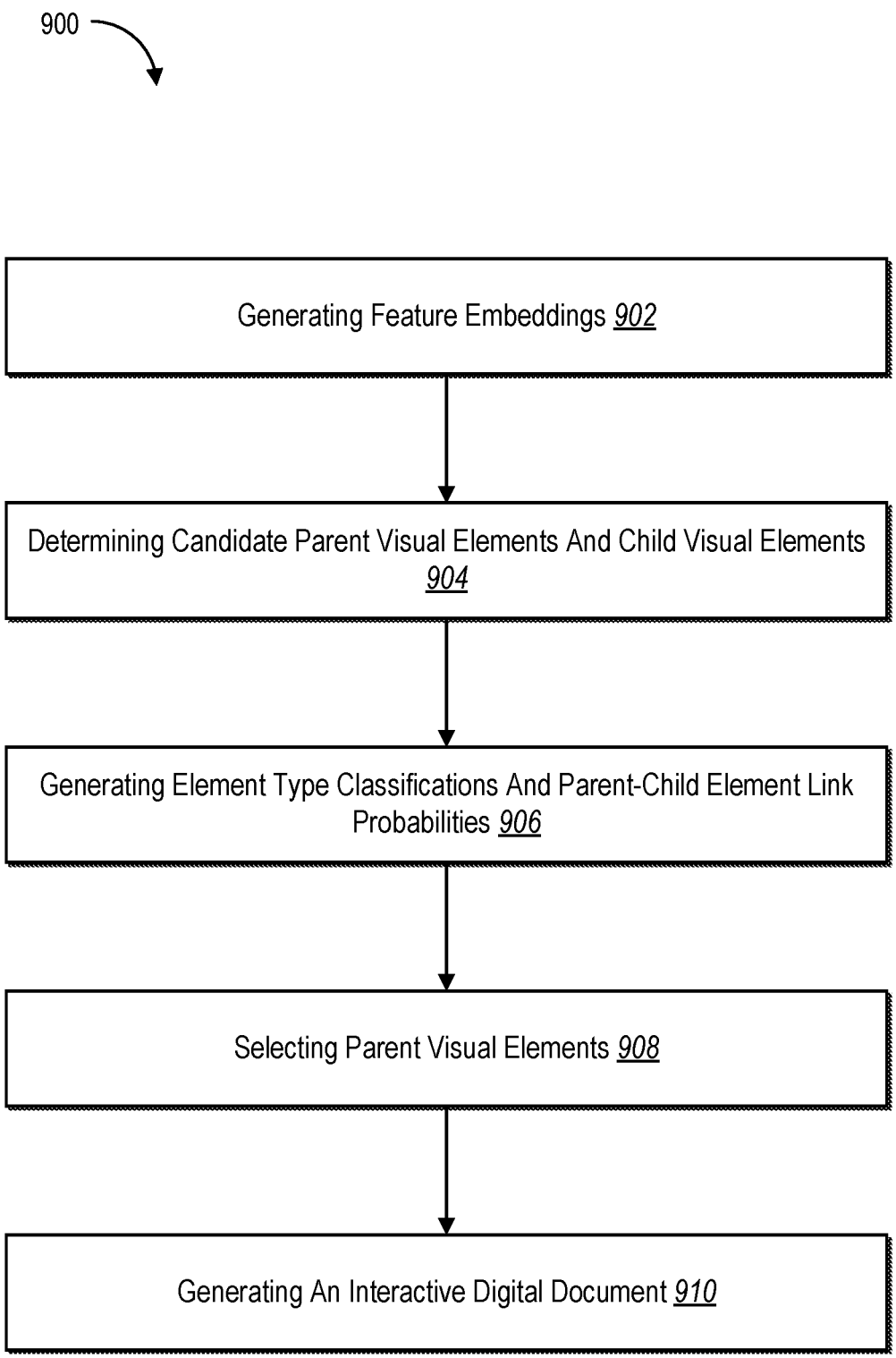
FIG. 9 illustrates a flowchart of a series of acts for generating a digital document hierarchy in accordance with one or more embodiments.

FIGS. 1-8, the corresponding text, and the examples provide a number of different methods, systems, devices, and non-transitory computer-readable media of the document hierarchy generation system 104. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for generating a digital document hierarchy in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

The series of acts 900 includes an act 902 of generating feature embeddings. For example, in one or more embodiments, the act 902 includes generating feature embeddings from visual elements of a digital document image.

In further embodiments, generating feature embeddings from the visual elements of the digital document image comprises generating spatial feature embeddings from positional coordinates of the visual elements within the digital document image and generating the element classifications for the candidate parent visual elements and the parent-child element link probabilities using the spatial feature embeddings. In some cases, wherein generating the feature embeddings from the visual elements of the digital document image comprises extracting text from a visual text element of the visual elements portrayed in the digital document image, generating, utilizing a trained language machine learning model, semantic feature embeddings from the text of the visual text element, and generating the element classifications for the candidate parent visual elements and the parent-child element link probabilities utilizing the semantic feature embeddings.

In some embodiments, generating feature embeddings from the visual elements of the digital document image comprises generating spatial feature embeddings from positional coordinates of the visual elements within the digital document image, generating, utilizing a trained language machine learning model, semantic feature embeddings from text of the visual elements, and generating the element classifications for the candidate parent visual elements and the parent-child element link probabilities utilizing the spatial feature embeddings and the semantic feature embeddings.

The series of acts 900 also includes generating a digital document hierarchy comprising layers of parent-child element relationships from the visual elements, for a layer of the layers.

The series of acts 900 also includes an act 904 of determining candidate parent visual elements and child visual elements. For instance, in some cases, the act 904 involves determining, from the visual elements, candidate parent visual elements and child visual elements.

The series of acts 900 further includes an act 906 of generating element type classifications and parent-child element link probabilities. For example, in some embodiments, the act 906 includes generating, from the feature embeddings utilizing a neural network, element classifications for the candidate parent visual elements and the child visual elements.

In some embodiments, generating utilizing the neural network the parent-child element link probabilities by generating, utilizing a multimodal transformer encoder of the neural network, parent vector representations from feature embeddings of the candidate parent visual elements; generating, utilizing the multimodal transformer encoder of the neural network, child vector representations from feature embeddings of the child visual elements and generating parent-child link probabilities utilizing the parent vector representations and the child vector representations. In some embodiments, utilizing the multimodal transformer encoder includes utilizing a first neural network layer of the neural network to generate the parent-child element link probabilities from the parent vector representations and the child vector representations; and utilizing a second neural network layer of the neural network to generate the element classifications for the candidate parent visual elements from the parent vector representations.

The series of acts 900 additionally includes an act 908 of selecting parent visual elements. For example, in certain embodiments, the act 908 includes selecting parent visual elements from the candidate parent visual elements based on the parent-child element link probabilities.

In some embodiments, selecting parent visual elements from the candidate parent visual elements based on the parent-child element link probabilities includes determining cost metrics from the parent-child element link probabilities, parent visual element sizes for the candidate parent visual elements, and child visual element sizes for the child visual elements and selecting the parent visual elements from the candidate parent visual elements by comparing the cost metrics.

In one or more embodiments, selecting the parent visual elements from the candidate parent visual elements based on the parent-child element link probabilities comprises utilizing an optimization model to select the parent visual elements from the candidate parent visual elements based on the parent-child element link probabilities, parent visual element sizes for the candidate parent visual elements, child visual element sizes for the child visual elements, and boundaries of the visual elements.

The series of acts 900 also involves an act 910 of generating an interactive digital document. For example, the act 910 involves utilizing the digital document hierarchy to generate an interactive digital document from the digital document image. In additional embodiments, the series of acts 900 further comprise determining, from the visual elements, the candidate parent visual elements by applying spatial constraints to identify particular visual elements that encompass one or more other visual elements and utilizing the digital document hierarchy to determine a text order for the digital document image.

Furthermore, generating the digital document hierarchy comprising the layers of parent-child element relationships from the visual elements comprises, for an additional layer of the layers, determining, from the parent visual elements of the layer, an additional set of candidate parent visual elements and an additional set of child visual elements for the additional layer; generating, utilizing the neural network for the additional layer, additional parent-child element link probabilities for the additional set of candidate parent visual elements and the additional set of child visual elements; and selecting additional parent elements for the additional layer from the additional set of candidate parent visual elements based on the additional parent-child element link probabilities. Moreover, in one or more embodiments, generating feature embeddings comprises generating structural embeddings from the element classifications for the layer and generating the additional parent-child element link probabilities for the additional layer utilizing structural embeddings.

In addition, the series of acts includes receiving a training dataset comprising a digital document image comprising a plurality of visual elements, ground truth parent-child element relationships and ground truth element classifications and training a neural network utilizing the parent-child element training dataset to generate element classifications and parent-child element links for digital document images. In some embodiments, training the neural network comprises generating, for candidate parent visual elements from the plurality of visual elements using the neural network, predicted element classifications and predicted parent-child element links, and modifying parameters of the neural network by comparing the predicted element classifications with the ground truth element classifications and comparing the parent-child element links with the ground truth parent-child element relationships.

In further embodiments, generating the predicted parent-child element link comprises generating, utilizing a multimodal transformer encoder of the neural network, parent vector representations from the candidate parent visual elements and generating, utilizing the multimodal transformer encoder of the neural network, child vector representations from child visual elements of the plurality of visual elements. Moreover, in some embodiments, generating the predicted parent-child element links comprises combining the parent vector representations with the child vector representations to generate combined parent-child vector representation and utilizing a first neural network layer of the neural network to generate the predicted parent-child element links from the combined parent-child vector representations. In some embodiments, generating the element classifications comprises utilizing a second neural network layer of the neural network to generate the element classifications from the parent vector representations.

In further embodiments, the series of acts further includes comparing the predicted element classifications with the ground truth element classifications comprises determining an element classification loss utilizing a first loss function, comparing the predicted parent-child element links with the ground truth parent-child element relationships comprises determining a parent-child link loss utilizing a second loss function, and modifying the parameters of the neural network comprises utilizing back propagation to modify the parameters based on the element classification loss and the parent-child link loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
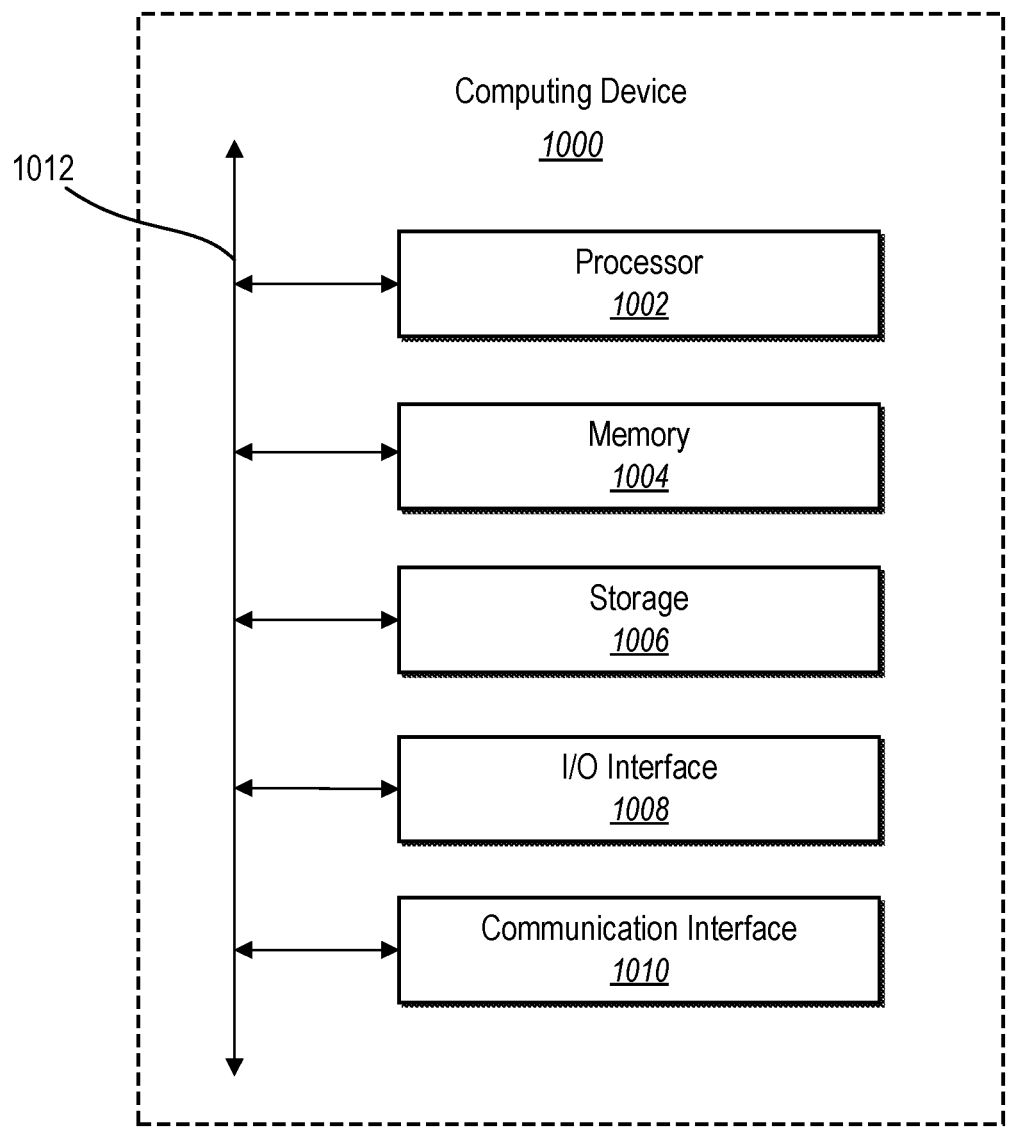
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server(s) 101, client devices 106, and third-party system 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in some embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating feature embeddings from visual elements of a digital document image;
generating a digital document hierarchy comprising layers of parent-child element relationships from the visual elements by, for a layer of the layers:
determining, from the visual elements, child visual elements and candidate parent visual elements for the child visual elements;
generating, from the feature embeddings utilizing a neural network, element classifications for the candidate parent visual elements and parent-child element link probabilities for the candidate parent visual elements and the child visual elements; and
selecting, from the candidate parent visual elements and based on the parent-child element link probabilities, parent visual elements for the child visual elements; and
utilizing the digital document hierarchy to generate an interactive digital document from the digital document image.

2. The method of claim 1, wherein generating the feature embeddings from the visual elements of the digital document image comprises:
generating spatial feature embeddings from positional coordinates of the visual elements within the digital document image; and
generating the element classifications for the candidate parent visual elements and the parent-child element link probabilities utilizing the spatial feature embeddings.

3. The method of claim 1, wherein generating the feature embeddings from the visual elements of the digital document image comprises:
extracting text from a visual text element of the visual elements portrayed in the digital document image;
generating, utilizing a trained language machine learning model, semantic feature embeddings from the text of the visual text element; and
generating the element classifications for the candidate parent visual elements and the parent-child element link probabilities utilizing the semantic feature embeddings.

4. The method of claim 1, wherein generating the digital document hierarchy comprising the layers of parent-child element relationships from the visual elements comprises, for an additional layer of the layers:
determining, from the parent visual elements of the layer, an additional set of candidate parent visual elements and an additional set of child visual elements for the additional layer;
generating, utilizing the neural network for the additional layer, additional parent-child element link probabilities for the additional set of candidate parent visual elements and the additional set of child visual elements; and
selecting additional parent elements for the additional layer from the additional set of candidate parent visual elements based on the additional parent-child element link probabilities.

5. The method of claim 4, wherein generating the feature embeddings comprises:
generating structural embeddings from the element classifications for the layer; and
generating the additional parent-child element link probabilities for the additional layer utilizing the structural embeddings.

6. The method of claim 1, further comprising generating, utilizing the neural network, the parent-child element link probabilities by:
generating, utilizing a multimodal encoder of the neural network, parent vector representations from feature embeddings of the candidate parent visual elements;
generating, utilizing the multimodal encoder of the neural network, child vector representations from feature embeddings of the child visual elements;
utilizing a first neural network layer of the neural network to generate the parent-child element link probabilities from the parent vector representations and the child vector representations; and utilizing a second neural network layer of the neural network to generate the element classifications for the candidate parent visual elements from the parent vector representations.

7. The method of claim 1, further comprising selecting the parent visual elements from the candidate parent visual elements based on the parent-child element link probabilities by:
determining cost metrics from the parent-child element link probabilities, parent visual element sizes for the candidate parent visual elements, and child visual element sizes for the child visual elements; and
selecting the parent visual elements from the candidate parent visual elements by comparing the cost metrics.

8. The method of claim 1, further comprising:
determining, from the visual elements, the candidate parent visual elements by applying spatial constraints to identify particular visual elements that encompass one or more other visual elements; and
utilizing the digital document hierarchy to determine a text order for the digital document image.

9. A system comprising:
at memory component; and
one or more processing devices coupled to the memory component, the one or more processing devices to perform operations comprising:
receiving a parent-child element training dataset comprising a digital document image comprising a plurality of visual elements, ground truth parent-child element relationships and ground truth element classifications; and
training a neural network utilizing the parent-child element training dataset to generate, for candidate parent visual elements predicted from the plurality of visual elements, element classifications and parent-child element links for digital document images.

10. The system of claim 9, wherein training the neural network comprises:
generating, for the candidate parent visual elements from the plurality of visual elements using the neural network, predicted element classifications and predicted parent-child element links; and
modifying parameters of the neural network by comparing the predicted element classifications with the ground truth element classifications and comparing the predicted parent-child element links with the ground truth parent-child element relationships.

11. The system of claim 10, wherein generating the predicted parent-child element links comprises:
generating, utilizing a multimodal encoder of the neural network, parent vector representations from the candidate parent visual elements; and
generating, utilizing the multimodal encoder of the neural network, child vector representations from child visual elements of the plurality of visual elements.

12. The system of claim 11, wherein generating the predicted parent-child element links comprises:
combining the parent vector representations with the child vector representations to generate combined parent-child vector representations; and
utilizing a first neural network layer of the neural network to generate the predicted parent-child element links from the combined parent-child vector representations.

13. The system of claim 11, wherein generating the element classifications comprises utilizing a second neural network layer of the neural network to generate the element classifications from the parent vector representations.

14. The system of claim 10, wherein:
comparing the predicted element classifications with the ground truth element classifications comprises determining an element classification loss utilizing a first loss function,
comparing the predicted parent-child element links with the ground truth parent-child element relationships comprises determining a parent-child link loss utilizing a second loss function, and
modifying the parameters of the neural network comprises utilizing back propagation to modify the parameters based on the element classification loss and the parent-child link loss.

15. A non-transitory computer-readable medium storing executable instructions which, when executed by a processing device, cause the processing device to perform operations comprising:
generating feature embeddings from visual elements of a digital document image;
generating a digital document hierarchy comprising layers of parent-child element relationships from the visual elements by, for a layer of the layers:
determining, from the visual elements, child visual elements and candidate parent visual elements for the child visual elements;
generating, from the feature embeddings utilizing a neural network, element classifications for the candidate parent visual elements and parent-child element link probabilities for the candidate parent visual elements and the child visual elements; and
selecting, from the candidate parent visual elements and based on the parent-child element link probabilities, parent visual elements for the child visual elements; and
utilize the digital document hierarchy to determine a text order for the digital document image.

16. The non-transitory computer-readable medium of claim 15, wherein generating the feature embeddings from the visual elements of the digital document image comprises:
generating spatial feature embeddings from positional coordinates of the visual elements within the digital document image;
generating, utilizing a trained language machine learning model, semantic feature embeddings from text of the visual elements; and
generating the element classifications for the candidate parent visual elements and the parent-child element link probabilities utilizing the spatial feature embeddings and the semantic feature embeddings.

17. The non-transitory computer-readable medium of claim 15, further comprising utilizing the digital document hierarchy to generate an interactive digital document from the digital document image.

18. The non-transitory computer-readable medium of claim 15, further comprising:
determining, from the parent visual elements of the layer, an additional set of candidate parent visual elements and an additional set of child visual elements for an additional layer;
generating, utilizing the neural network for the additional layer, additional element classifications and additional parent-child element link probabilities; and
selecting additional parent elements for the additional layer from the additional set of candidate parent visual elements based on the additional parent-child element link probabilities.

19. The non-transitory computer-readable medium of claim 15, wherein generating, utilizing the neural network, the parent-child element link probabilities comprises:
- generating, utilizing a multimodal encoder of the neural network, parent vector representations from feature embeddings of the candidate parent visual elements;
- generating, utilizing the multimodal encoder of the neural network, child vector representations from feature embeddings of the child visual elements; and
- generating the parent-child element link probabilities utilizing the parent vector representations and the child vector representations.

20. The non-transitory computer-readable medium of claim 15, wherein selecting the parent visual elements from the candidate parent visual elements based on the parent-child element link probabilities comprises utilizing an optimization model to select the parent visual elements from the candidate parent visual elements based on the parent-child element link probabilities, parent visual element sizes for the candidate parent visual elements, child visual element sizes for the child visual elements, and boundaries of the visual elements.

* * * * *